(12) United States Patent
Minami

(10) Patent No.: US 7,736,271 B2
(45) Date of Patent: Jun. 15, 2010

(54) CLUTCH CONTROLLER, METHOD FOR CONTROLLING CLUTCH, AND STRADDLE-TYPE VEHICLE

(75) Inventor: Kengo Minami, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 324 days.

(21) Appl. No.: 12/035,746

(22) Filed: Feb. 22, 2008

(65) Prior Publication Data

US 2008/0207397 A1 Aug. 28, 2008

(30) Foreign Application Priority Data

Feb. 23, 2007 (JP) ............................. 2007-043645
Sep. 6, 2007 (JP) ............................. 2007-231132

(51) Int. Cl.
*B60W 10/02* (2006.01)
(52) U.S. Cl. ...................................................... 477/176
(58) Field of Classification Search ....................... None
See application file for complete search history.

(56) References Cited

U.S. PATENT DOCUMENTS

| | | | | |
|---|---|---|---|---|
| 5,704,872 A | * | 1/1998 | Kosik et al. | 477/74 |
| 6,045,484 A | * | 4/2000 | Kosik et al. | 477/174 |
| 6,319,173 B1 | * | 11/2001 | Patel et al. | 477/180 |
| 7,037,239 B2 | * | 5/2006 | Werner et al. | 477/176 |
| 2008/0207399 A1 | * | 8/2008 | Minami et al. | 477/175 |
| 2008/0208423 A1 | * | 8/2008 | Minami | 701/67 |
| 2008/0254942 A1 | * | 10/2008 | Minami | 477/176 |
| 2009/0055060 A1 | * | 2/2009 | Minami | 701/54 |

FOREIGN PATENT DOCUMENTS

JP 2001-146930 5/2001

* cited by examiner

*Primary Examiner*—Dirk Wright
(74) *Attorney, Agent, or Firm*—Rabin & Berdo, PC

(57) ABSTRACT

A clutch controller that transmits appropriate torque during engaging operation of a clutch and prevents excessive increase or decrease in engine speed. The clutch controller performs request follow-up control under which a clutch actuator is actuated based on a difference between actual transmission torque that is transmitted from a drive-side member to a driven-side member of a clutch, and request transmission torque that is determined based on a rider's accelerator operation, such that the actual transmission torque approximates the request transmission torque. In an operation range in which engine torque increases as engine speed increases, the clutch controller performs rotational speed induction control, in place of request follow-up control, under which the clutch actuator is actuated such that engine speed increases or decreases to a predetermined engine speed.

8 Claims, 19 Drawing Sheets

Fig. 5
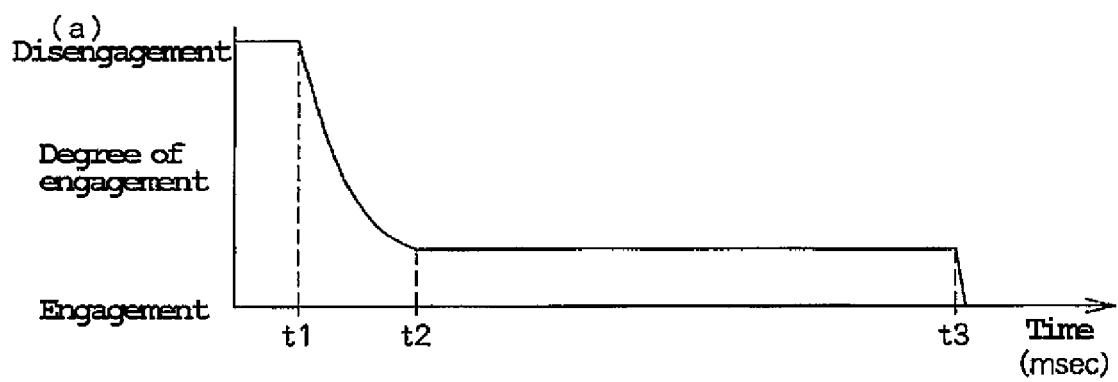
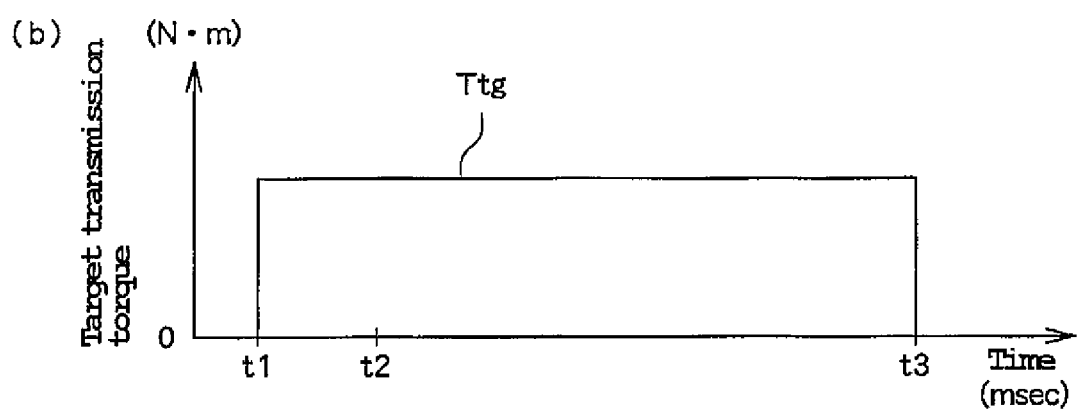
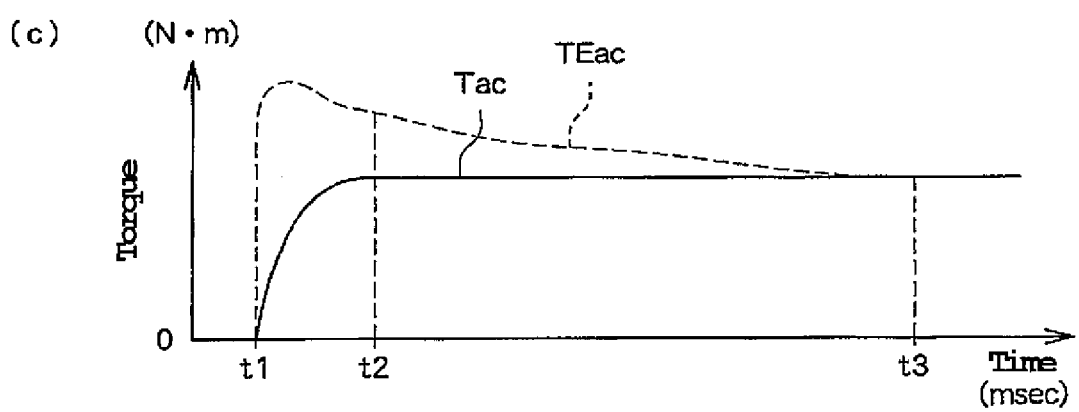

Fig. 10
(a)
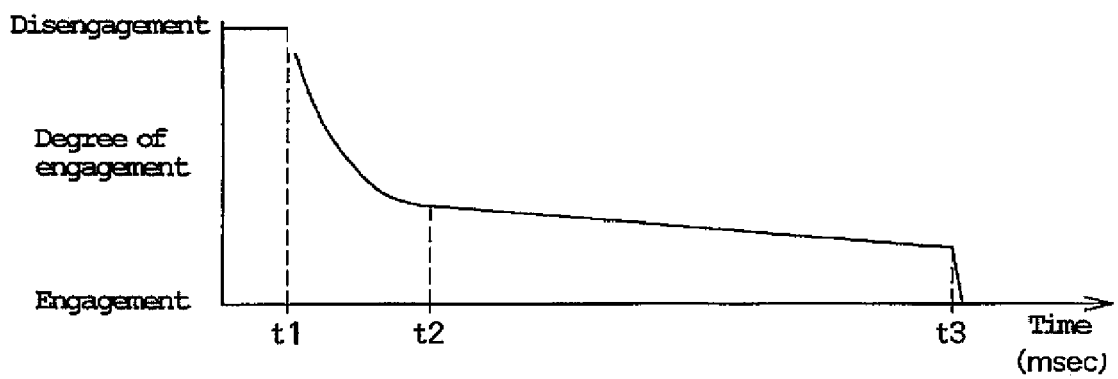
(b)
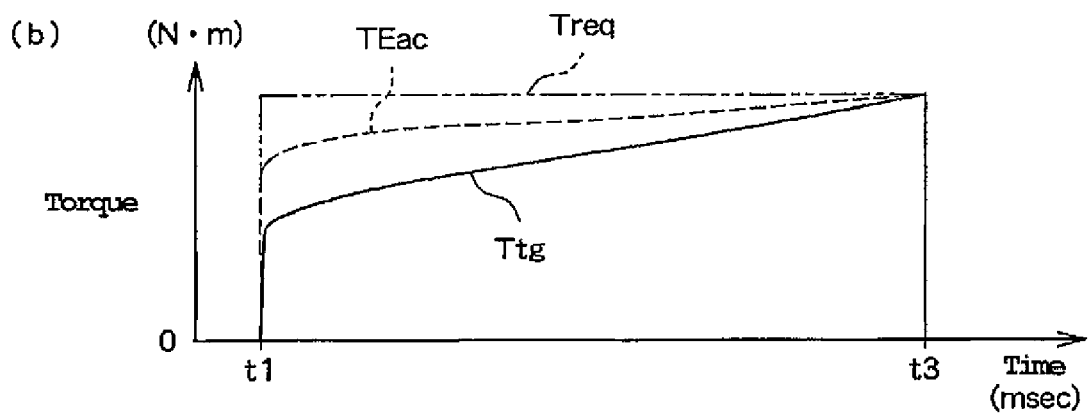
(c)
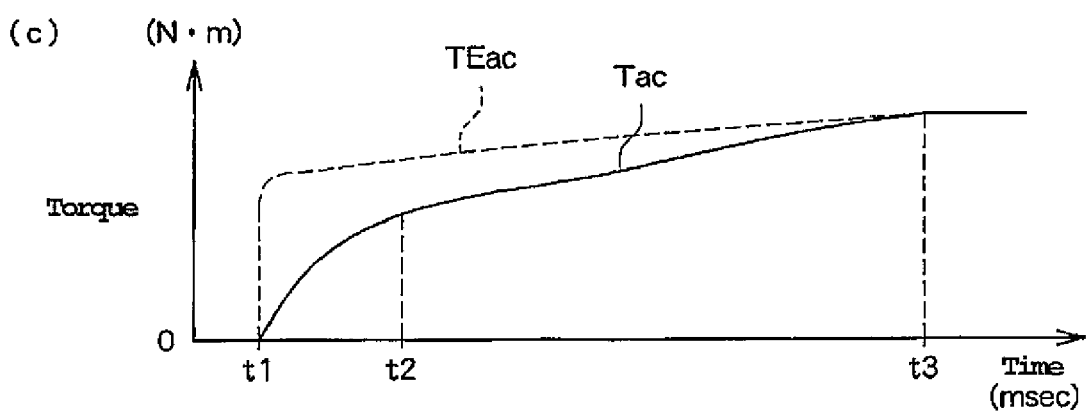

| Engine speed (rpm)<br>Accelerator displacement(%) | 3000 | 3010 | 3020 | ... | ... | 8990 | 9000 |
|---|---|---|---|---|---|---|---|
| 0% | Decrease | Decrease | Decrease | ... | ... | Decrease | Decrease |
| 5% | Decrease | Decrease | Decrease | ... | ... | Decrease | Decrease |
| 10% | Decrease | Decrease | Decrease | ... | ... | Decrease | Decrease |
| ... | ... | ... | ... | ... | ... | ... | ... |
| ... | ... | ... | ... | ... | ... | ... | ... |
| 95% | Increase | Increase | Increase | ... | ... | Decrease | Decrease |
| 100% | Increase | Increase | Increase | ... | ... | Decrease | Decrease |

| Engine speed (rpm) / Accelerator displacement (%) | ... | 4950 | 5000 | 5050 | ... | 6000 | 6050 | 6100 | ... |
|---|---|---|---|---|---|---|---|---|---|
| ... | | ... | ... | ... | | ... | ... | ... | |
| 70% | | 0.55 | 0.60 | 0.65 | | 0.90 | 0.95 | 1.00 | |
| 75% | | 0.60 | 0.65 | 0.70 | | 0.95 | 1.00 | 1.05 | |
| 80% | | 0.65 | 0.70 | 0.75 | | 1.00 | 1.05 | 1.10 | |
| 85% | | 0.70 | 0.75 | 0.80 | | 1.05 | 1.10 | 1.15 | |
| ... | | ... | ... | ... | | ... | ... | ... | |

CLUTCH CONTROLLER, METHOD FOR CONTROLLING CLUTCH, AND STRADDLE-TYPE VEHICLE

RELATED APPLICATIONS

This application claims the benefit of priority under 35 USC 119 of Japanese patent application no. 2007-043645, filed on Feb. 23, 2007, and Japanese patent application no. 2007-231132, filed on Sep. 6, 2007, which applications are hereby incorporated by reference in their entireties.

BACKGROUND OF THE INVENTION

1. Field of the Invention

The present invention relates to a technology for engaging or disengaging a clutch by an actuator.

2. Description of Related Art

Conventional semi-automatic vehicles, which actuate an actuator to engage or disengage a clutch, control relative positions of drive-side and driven-side members of the clutch (the degree of engagement of the clutch) based on a difference in rotational speed between these members during engaging operation of the clutch (see, for example, JP-A-2001-146930).

The degree of engagement of the clutch is controlled based on the difference in rotational speed between the drive-side and driven-side members. However, this can prevent appropriate torque from being constantly transmitted via the clutch, and thus can impair riding comfort. For example, when the timing of discontinuing a half-clutch state is too early, the torque transmitted from the drive-side member to the driven-side member sharply increases. This can impair riding comfort. Maintenance of a half-clutch state until the difference in rotational speed is almost zero has also been proposed. However, this results in excessively low torque being continuously transmitted to the driven-side member for a long time period. Thus, the rider may perceive that the vehicle decelerates excessively.

SUMMARY OF THE INVENTION

The present invention addresses the foregoing problems and provides a clutch controller for a straddle-type vehicle that transmits appropriate torque to the downstream side via the clutch and prevents engine speed from excessively increasing or decreasing during engaging operation of the clutch.

Accordingly, the present invention provides a clutch controller including an actuator for changing the degree of engagement between drive-side and driven-side members of a clutch located downstream of an engine in a torque transmission path. An actual torque obtaining section obtains torque transmitted from the drive-side member to a downstream mechanism of the torque transmission path as actual transmission torque, the downstream mechanism including the driven-side member. A request torque obtaining section obtains torque determined based on a rider's accelerator operation as request transmission torque. A control unit performs a first control under which the actuator is actuated based on a difference between the actual transmission torque and the request transmission torque, such that the actual transmission torque approximates the request transmission torque. The control unit performs a second control, in place of the first control under which the actuator is actuated such that an engine speed increases or decreases to a predetermined engine speed, in an operation range in which engine torque outputted from the engine increases as the engine speed increases.

The present invention is also directed to a straddle-type vehicle including the clutch controller.

Further, the present invention is directed to a method for controlling a clutch including the steps of: obtaining torque transmitted from a drive-side member of the clutch to a driven-side member of the clutch or a mechanism downstream of the driven-side member in a torque transmission path as actual transmission torque; obtaining torque determined based on a rider's accelerator operation as request transmission torque; performing a first control under which an actuator, which changes a degree of engagement between the drive-side member and the driven-side member, is actuated based on a difference between the actual transmission torque and the request transmission torque, such that the actual transmission torque approximates the request transmission torque, in an operation range in which engine torque outputted from an engine decreases as an engine speed increases; and performing a second control under which the actuator is actuated such that the engine speed increases or decreases to a predetermined engine speed in an operation range in which the engine torque increases as the engine speed increases.

The present invention transmits appropriate torque to the downstream side via the clutch during engaging operation of the clutch. The present invention also prevents an excessive increase or decrease in engine speed in the operation range in which the engine torque increases as the engine speed increases. That is, if the actual transmission torque is higher than the engine torque, the engine speed decreases, and if the actual transmission torque is lower than the engine torque, the engine speed increases. Also, if the engine operates in the operation range in which the engine torque increases as the engine speed increases, an increase or a decrease in engine speed due to a difference between the actual transmission torque and the engine torque causes the difference between the actual transmission torque and the engine torque to be greater, and therefore, the engine speed further increases or decreases. According to the present invention, in the operation range in which the engine torque increases as the engine speed increases, the actuator is actuated such that the engine speed increases or decreases to a predetermined engine speed. This prevents such an excessive increase or decrease in engine speed. The straddle-type vehicle of the invention may be a motorcycle (including a scooter), a four-wheeled buggy or a snowmobile, for example.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 5(a)-5(c) are time charts respectively showing examples of changes in degree of engagement of a clutch, target transmission torque Ttg, actual transmission torque Tac, and EG torque TEac when request follow-up control is performed.

FIGS. 10(a)-10(c) are time charts respectively showing examples of changes in degree of engagement of the clutch, target transmission torque Ttg, actual transmission torque Tac, and EG torque TEac when rotational speed induction control is performed.

FIG. 14 illustrates an example of a range determining table.

FIG. 15 illustrates an example of an EG torque table.

DETAILED DESCRIPTION OF THE INVENTION

Figure 1:
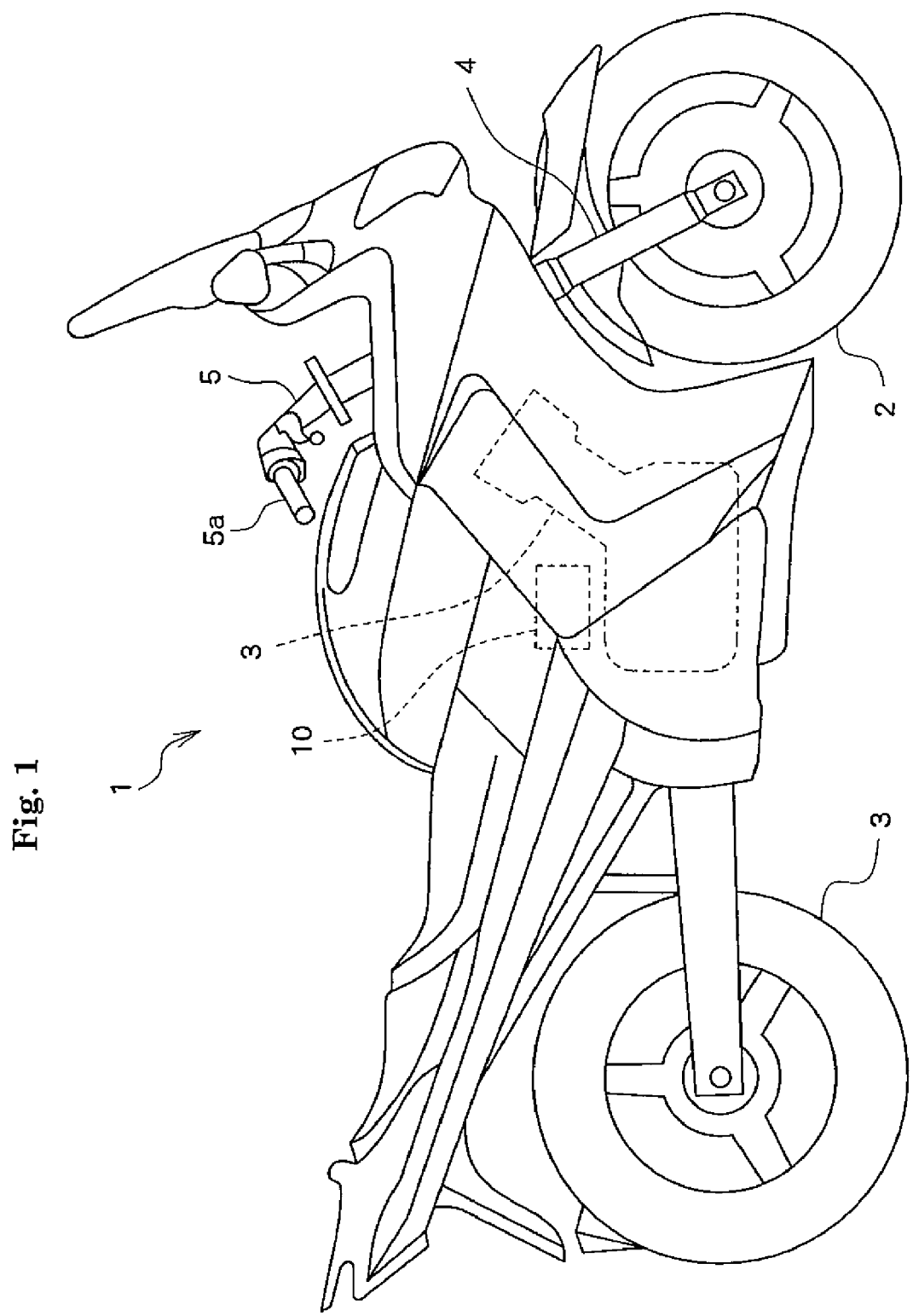
FIG. 1 is a side view of a motorcycle provided with a clutch controller according to an embodiment of the present invention.
Figure 2:
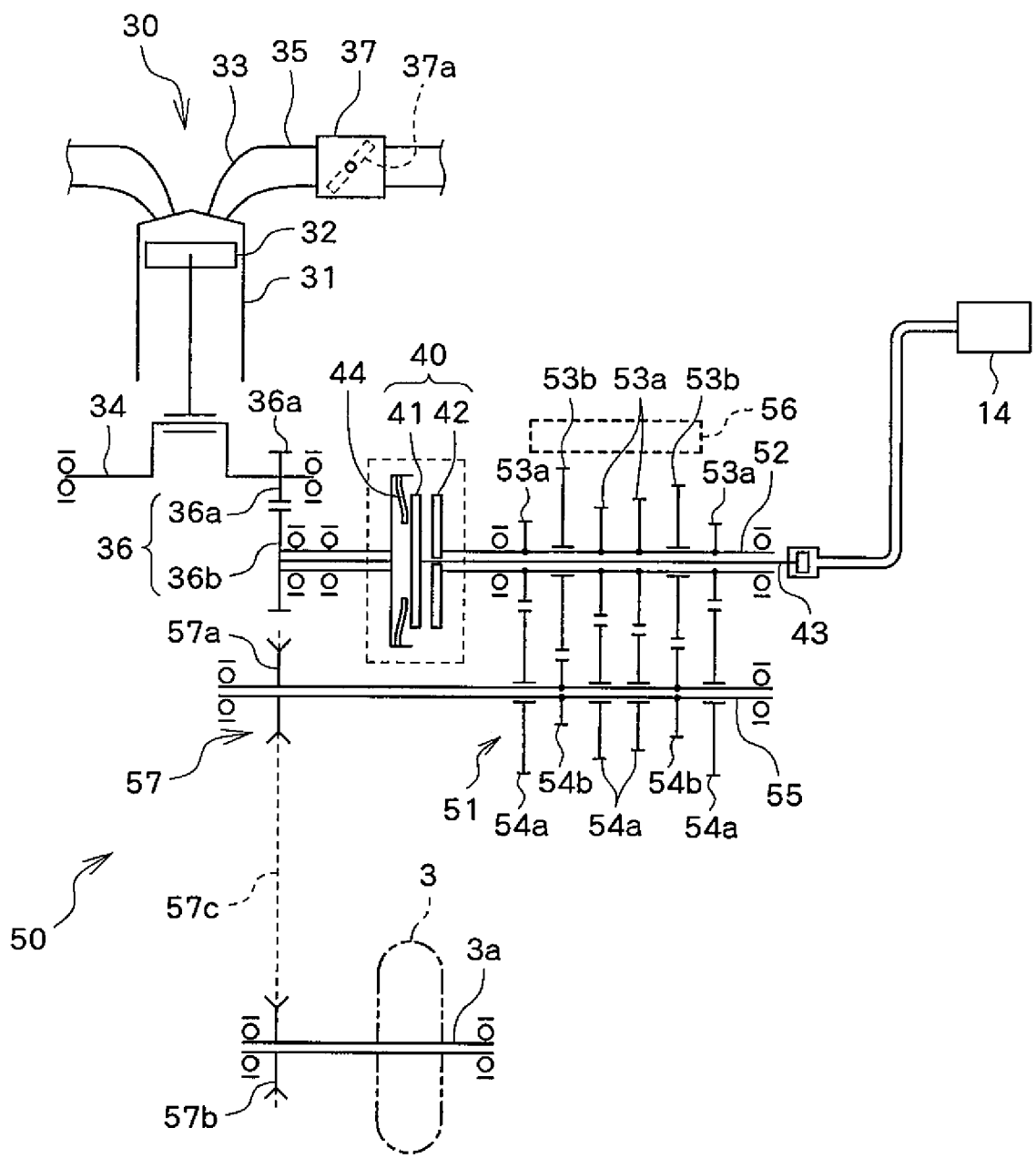
FIG. 2 is a schematic view of a mechanism provided on a torque transmission path of the motorcycle.

An embodiment of the present invention is described below with reference to the drawings. FIG. 1 is a side view of a motorcycle 1 provided with a clutch controller 10 according to the invention. FIG. 2 is a schematic view of a mechanism located on a torque transmission path of motorcycle 1.

As shown in FIGS. 1 and 2, in addition to clutch controller 10, motorcycle 1 comprises an engine 30, a primary speed reducing mechanism 36, a clutch 40, a secondary speed reducing mechanism 50, a front wheel 2 and a rear wheel 3.

Front wheel 2 is supported by a lower end of a front fork 4, and handlebars 5 are connected to the top of front fork 4. An acceleration grip 5a mounted to a right end of handlebars 5 is connected to a throttle valve 37a provided in a throttle body 37 (FIG. 2). Throttle valve 37a is opened according to a rider's accelerator operation, and a certain amount of air that depends on the opening of throttle valve 37a is delivered to engine 30. Motorcycle 1 may be provided with an electronically-controlled throttle device. In this case, a sensor for detecting the rider's accelerator operation and an actuator for opening throttle valve 37a according to the detected accelerator operation are provided.

As shown in FIG. 2, engine 30 has a cylinder 31, a piston 32, an intake port 33 and a crankshaft 34. Throttle body 37 is connected to intake port 33 via an intake pipe 35.

Throttle valve 37a is placed in an intake passage of throttle body 37. A mixture of air that flows through the intake passage of throttle body 37 and fuel supplied from a fuel supplier (for example, an injector or carburetor) is delivered to an interior of cylinder 31. An ignition plug faces the interior of cylinder 31 and ignites the air-fuel mixture within cylinder 31. Burning the air-fuel mixture causes piston 32 to reciprocate within cylinder 31. The reciprocating motion of piston 32 is converted into rotating motion by crankshaft 34, thereby outputting torque from engine 30.

Primary speed reducing mechanism 36 includes a drive-side primary reduction gear 36a that operates in conjunction with crankshaft 34; and a driven-side primary reduction gear 36b that meshes with primary reduction gear 36a. Primary speed reducing mechanism 36 decelerates rotation of crankshaft 34 according to a gear ratio between these gears.

Clutch 40 transmits and shuts off torque output from engine 30 to the downstream side of the torque transmission path. Clutch 40 is a friction clutch, for example, and is provided with a drive-side member 41 and a driven-side member 42. Drive-side member 41 includes a friction disk, for example, and rotates together with primary reduction gear 36b. Driven-side member 42 includes a clutch disk, for example, and rotates together with a main shaft 52. Drive-side member 41 and driven-side member 42 are pressed against each other by elastic force of a clutch spring 44 at the time of engaging clutch 40, so that the torque of engine 30 is transmitted from drive-side member 41 to driven-side member 42. In turn, at the time of disengaging clutch 40, driven-side member 42 is moved away from drive-side member 41, so that torque transmission from drive-side member 41 is interrupted. Clutch controller 10 is provided with a clutch actuator 14 as will be discussed later. Clutch actuator 14 performs an engaging operation of clutch 40 (switching from the disengaged state to the engaged state) and a disengaging operation thereof (switching from the engaged state to the disengaged state).

Secondary speed reducing mechanism 50 decelerates rotation of main shaft 52 and transmits the decelerated rotation to an axle 3a of rear wheel 3. Secondary speed reducing mechanism 50 is provided with a gearbox 51 and a transmission mechanism 57. Gearbox 51 is a mechanism to change deceleration ratios, such as a constant-mesh gearbox and a selective-sliding gearbox.

Gearbox 51 has plural shift gears 53a (for example, first-speed, second-speed, third/fourth-speed gears) and shift gears 53b (for example, fifth-speed and six-speed gears) on main shaft 52. Gearbox 51 also has plural shift gears 54a (for example, first-speed, second-speed, third/fourth-speed gears) and shift gears 54b (for example, fifth-speed and six-speed gears) on countershaft 55. Shift gears 53a are spline-connected to and operate in conjunction with main shaft 52. Shift gears 54a run idle to countershaft 55 and mesh with shift gears 53a. Shift gears 53b run idle to main shaft 52. Shift gears 54b mesh with shift gears 53b and are spline-connected to and operate in conjunction with countershaft 55.

Gearbox 51 also comprises a gearshift mechanism 56. Gearshift mechanism 56 includes a shift fork and a shift drum, for example, and selectively moves shift gears 53a, 53b, 54a, 54b in the axial direction of main shaft 52 or countershaft 55. Then, gearshift mechanism 56 causes shift gears 53b, 54a, which are provided to turn free to the corresponding shafts, to connect with adjacent shift gears 53a, 54b, which operate in conjunction with the corresponding shafts.

This changes shift gears 53a, 53b, 54a, 54b to transmit torque from main shaft 52 to countershaft 55. Gearshift mechanism 56 is actuated by receiving power from a shift actuator 16.

Transmission mechanism 57 decelerates rotation of countershaft 55 and transmits the decelerated rotation to axle 3a of rear wheel 3. Transmission mechanism 57 includes a drive-side member 57a (for example, a drive-side sprocket) that operates in conjunction with countershaft 55; a driven-side member 57b (for example, a driven-side sprocket) that operates in conjunction with axle 3a; and a transmission member 57c (for example, a chain) that transmits torque from drive-side member 57a to driven-side member 57b.

Torque outputted from engine 30 is transmitted to drive-side member 41 of clutch 40 via primary speed reducing mechanism 36. Torque transmitted to drive-side member 41 is transmitted to axle 3a of rear wheel 3 via driven-side member 42, gearbox 51 and transmission mechanism 57, when clutch 40 is engaged or when drive-side member 41 and driven-side member 42 contact each other, that is, when clutch 40 is in a half-clutch state.

Figure 3:
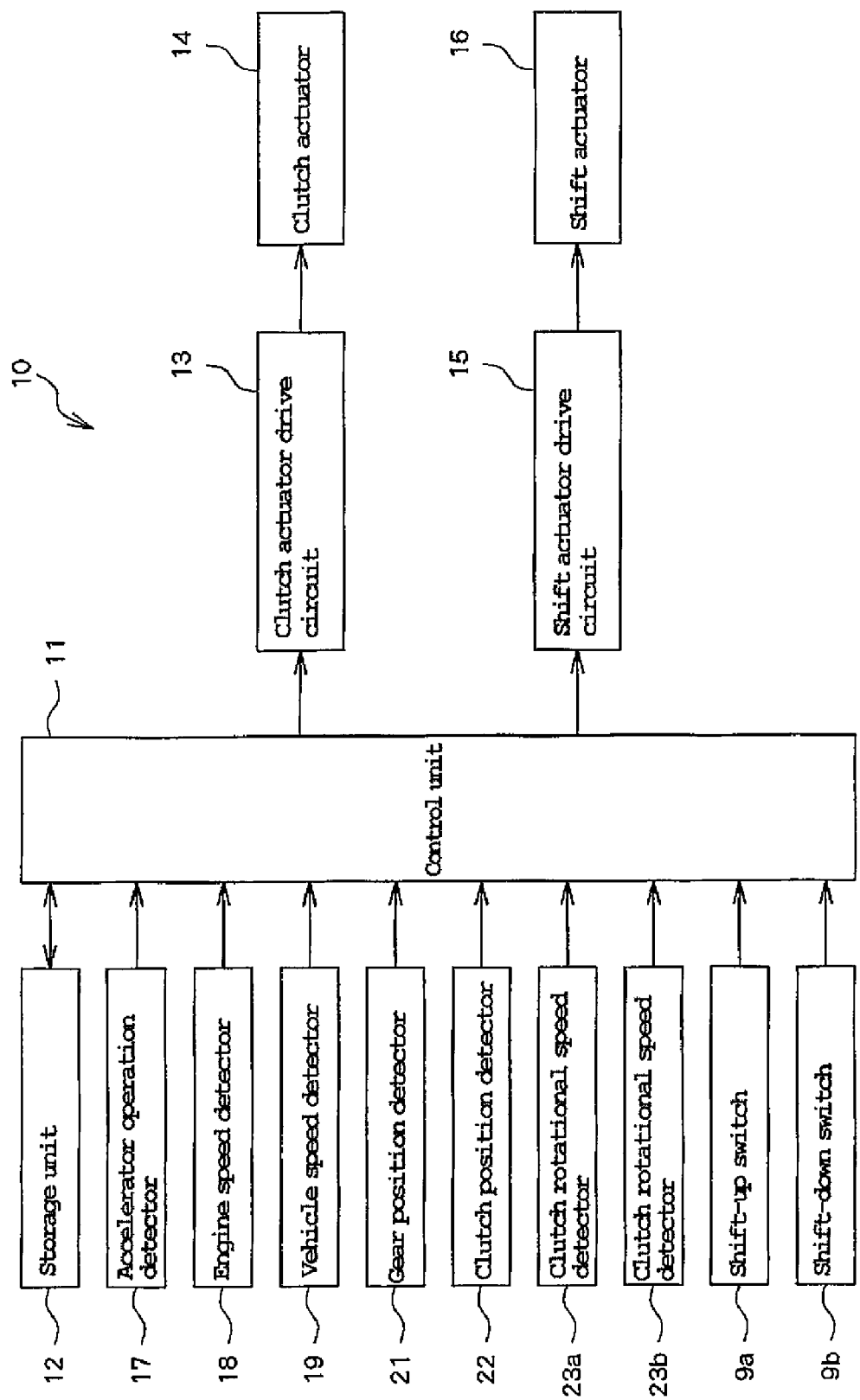
FIG. 3 is a block diagram of the clutch controller.

A configuration of clutch controller 10 is now described. Motorcycle 1 is a semi-automatic vehicle that changes the shift gears of gearbox 51 without the need for the rider to operate the clutch. Clutch controller 10 controls the degree of engagement of clutch 40 (relative positions of drive-side member 41 and driven-side member 42), and changes shift gears 53a, 53b, 54a, 54b. FIG. 3 is a block diagram of clutch controller 10. As shown in FIG. 3, clutch controller 10 comprises a control unit 11, a storage unit 12, a clutch actuator drive circuit 13, a clutch actuator 14, a shift actuator drive circuit 15, a shift actuator 16, an accelerator operation detector 17, an engine speed detector 18, a vehicle speed detector 19, a gear position detector 21, a clutch position detector 22 and clutch rotational speed detectors 23a, 23b. Control unit 11 is connected to a shift-up switch 9a and a shift-down switch 9b.

Control unit 11 includes a central processing unit (CPU) and operates in accordance with programs stored in storage unit 12. Specifically, control unit 11 changes shift gears 53a, 53b, 54a, 54b of gearbox 51 according to the rider's gearshift operation (in this example, switching shift-up switch 9a or shift-down switch 9b ON), while controlling the degree of engagement of clutch 40 during engaging operation thereof. The processing executed by control unit 11 is discussed in detail later.

Storage unit 12 includes a nonvolatile memory and a volatile memory. Storage unit 12 stores in advance programs executed by control unit 11 and tables or expressions used for processing in control unit 11. These tables and expressions are discussed in detail later.

Clutch actuator drive circuit 13 supplies drive voltage or drive current to clutch actuator 14 in accordance with a control signal inputted from control unit 11. Clutch actuator 14 includes, for example, a motor and a power transmission mechanism (such as hydraulic path and wire), and is driven by receiving electric power supplied by clutch actuator drive circuit 13. In this example, clutch actuator 14 presses a push rod 43 or releases the pressed push rod 43. When push rod 43 is pressed by clutch actuator 14, it moves drive-side member 41 and driven-side member 42 away from each other against the elastic force of clutch spring 44, so that clutch 40 is disengaged. In contrast, when the pressed push rod 43 is released by clutch actuator 14, it returns to its original position (the position at the time when clutch 40 is engaged) using the elastic force of clutch spring 44. Thus, drive-side member 41 and driven-side member 42 approach each other, so that clutch 40 is engaged. In addition, clutch actuator 14 puts clutch 40 to be in a half-clutch state during engaging operation of clutch 40. When clutch 40 is in a half-clutch state, only part of the torque of engine 30 is transmitted from drive-side member 41 to driven-side member 42.

Shift actuator drive circuit 15 supplies drive voltage or drive current to shift actuator 16 in accordance with a control signal inputted from control unit 11. Shift actuator 16 includes, for example, a motor and a power transmission mechanism (such as hydraulic path and wire), and is driven by receiving electric power supplied from shift actuator drive circuit 15. Shift actuator 16 actuates gearshift mechanism 56 to change shift gears 53a, 53b, 54a, 54b to transmit torque from main shaft 52 to countershaft 55, in order to change the deceleration ratios.

Accelerator operation detector 17 detects an amount of accelerator operation by the rider (hereinafter referred to as accelerator displacement). Examples of accelerator operation detector 17 are a throttle position sensor for detecting a throttle opening and an accelerator position sensor mounted to accelerator grip 5a to detect a rotation angle of accelerator grip 5a. Based on the signal outputted from accelerator operation detector 17, control unit 11 detects the accelerator displacement by the rider.

Engine speed detector 18 detects a rotational speed of engine 30 (hereinafter referred to as engine speed). Examples of engine speed detector 18 are a crank angle sensor for outputting a pulse signal with a frequency according to the rotational speed of crankshaft 43 or primary reduction gears 36a, 36b and a tachogenerator for outputting a voltage signal according to the rotational speed thereof. Control unit 11 calculates engine speed based on the signal inputted from engine speed detector 18.

Vehicle speed detector 19 detects a vehicle speed and outputs a signal to the control unit 11 according to, for example, the rotational speed of axle 3a of rear wheel 3 or that of countershaft 55. Control unit 11 calculates the vehicle speed based on the signal. Vehicle speed detector 19 may output a signal to control unit 11 according to the rotational speed of main shaft 52. In this case, control unit 11 calculates the vehicle speed not only based on the input signal, but also based on the deceleration ratio of gearbox 51 and that of transmission mechanism 57.

Gear position detector 21 detects positions of shift gears 53a, 53b, 54a, 54b provided movably in the axial direction of countershaft 55 or main shaft 52. An example of gear position detector 21 is a potentiometer mounted to gearshift mechanism 56 or shift actuator 16. Gear position detector 21 outputs a signal to control unit 11 according to the positions of shift gears 53a, 53b, 54a, 54b. Based on the input signal, control unit 11 detects that movements of shift gears 53a, 53b, 54a, 54b, which are associated with gear shifting, have been completed.

Clutch position detector 22 detects the degree of engagement of clutch 40. Examples of clutch position detector 22 are a potentiometer for outputting a signal according to the position of push rod 43 and a potentiometer for outputting a signal according to the position or rotation angle of the output shaft of clutch actuator 14. Based on the signal inputted from clutch position detector 22, control unit 11 detects the degree of engagement of clutch 40.

Clutch rotational speed detector 23a detects the rotational speed of the drive-side member 41. Examples of clutch rotational speed detector 23a are a rotary encoder for outputting a pulse signal with a frequency according to the rotational speed of drive-side member 41 and a tachogenerator for outputting a voltage signal according to the rotational speed of drive-side member 41. In turn, clutch rotational speed detector 23b is designed to detect the rotational speed of driven-side member 42. Examples of clutch rotational speed detector 23b are a rotary encoder and a tachogenerator, as described for clutch rotational speed detector 23a.

Shift-up switch 9a and shift-down switch 9b allow the rider to provide instructions to change shift gears 53a, 53b, 54a, 54b to clutch controller 11. Switches 9a, 9b output a signal to control unit 11 according to the gear shift instructions. Control unit 11 actuates shift actuator 16 according to the input signal to change shift gears 53a, 53b, 54a, 54b to transmit torque from main shaft 52 to countershaft 55. Shift-up switch 9a and shift-down switch 9b are provided adjacent to accelerator grip 5a, for example.

The processing executed by control unit 11 is now described. Control unit 11 obtains torque Tac transmitted from drive-side member 41 to the downstream mechanism (such as driven-side member 42, or countershaft 55 and axle 3a located downstream of driven-side member 42) in the torque transmission path including driven-side member 42 (hereinafter referred to as actual transmission torque). In addition, control unit 11 obtains torque Treq, which is requested by the rider, according to the accelerator displacement detected by accelerator operation detector 17 hereinafter referred to as request transmission torque). Further, control unit 11 obtains torque Ttg which is supposed to be transmitted from drive-side member 41 to the downstream mechanism (hereinafter referred to as target transmission torque). Then, in an operation range in which the torque outputted from engine 30 decreases as engine speed increases (hereinafter referred to as the torque-decreasing operation range), control unit 11 sets target transmission torque Ttg at request transmission torque Treq, and actuates clutch actuator 14 according to a difference between actual transmission torque Tac and target transmission torque Ttg, such that Tac approximates Ttg (hereinafter this control is referred to as request follow-up control (first control)).

Figure 4:
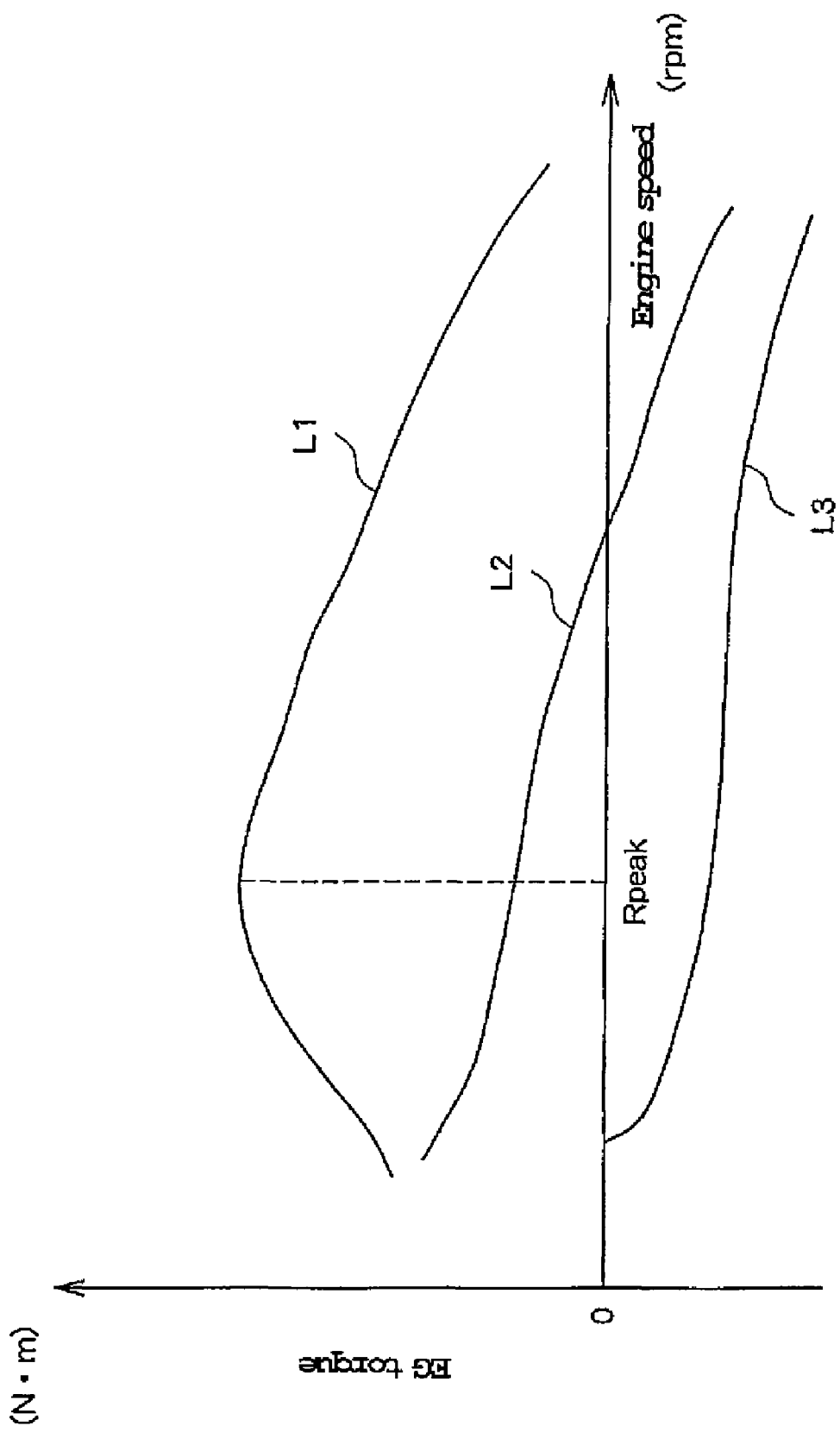
FIG. 4 is a graph illustrating an operation range of an engine.

The operation range of engine 30 is first described with reference to FIG. 4. In FIG. 4, the horizontal axis represents engine speed, and the vertical axis represents torque TEac produced by engine 30 (hereinafter referred to as EG torque). Torque curves L1-L3 represent output characteristics of engine 30. Torque curve L1 shows the relationship between engine speed and EG torque TEac, if accelerator displacement is large or accelerator grip 5a is operated greatly. In turn, torque curve L3 shows the relationship between engine speed and EG torque TEac, if accelerator displacement is small. Torque curve L2 shows the relationship between engine speed and EG torque TEac, if accelerator displacement is moderate.

If accelerator displacement is large, torque curve L1 shows the maximum EG torque TEac at the engine speed of a value Rpeak. When the engine speed is lower than Rpeak, EG torque TEac increases as engine speed increases, and when the engine speed is higher than Rpeak, EG torque TEac decreases as engine speed increases. By contrast, when accelerator displacement is small or moderate, torque curves L2 and L3 show that engine torque TEac always decreases as engine speed increases.

Figure 6:
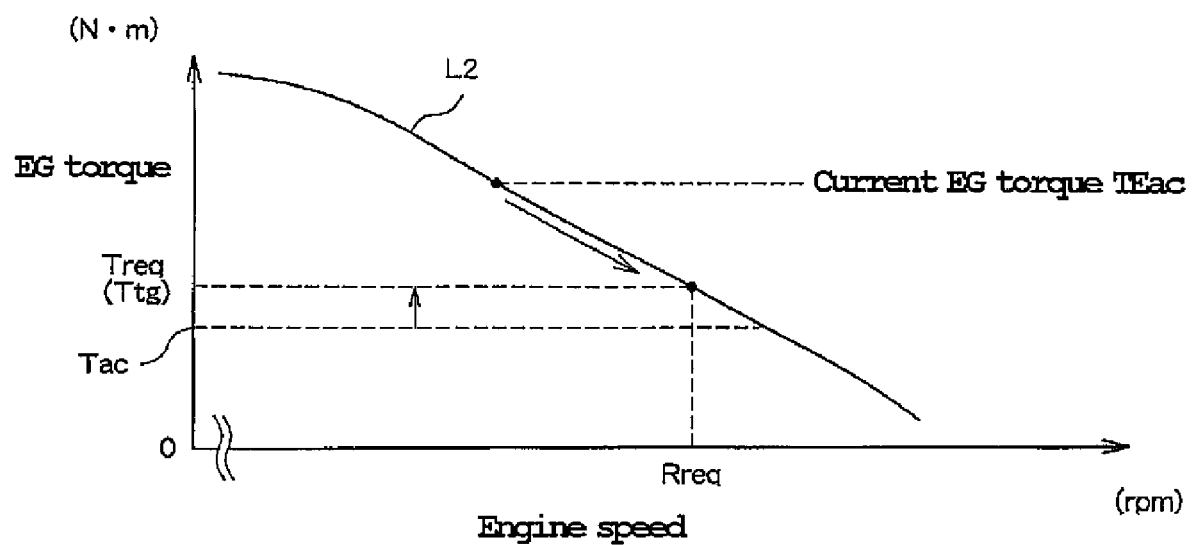
FIG. 6 illustrates changes in engine speed and EG torque TEac when request follow-up control is performed.

An overview of request follow-up control is now described. FIGS. 5(a)-(c) are time charts showing examples of changes in degree of engagement of clutch 40, target transmission torque Ttg, actual transmission torque Tac and EG torque TEac when request follow-up control is performed in the torque-decreasing operation range. FIG. 5(a) shows the degree of engagement of clutch 40. FIG. 5(b) shows target transmission torque Ttg. FIG. 5(c) shows actual transmission torque Tac and EG torque TEac. FIG. 6 illustrates changes in engine speed and EG torque TEac when request follow-up control is performed in the torque-decreasing operation range. In FIG. 6, the horizontal axis represents engine speed, and the vertical axis represents EG torque. Line L2 in FIG. 6 is a torque curve in the case of medium accelerator displacement. FIG. 6 shows EG torque TEac obtained at the point in time immediately before time t2 in FIG. 5, and so forth. Hereinafter, EG torque TEac is described as a value obtained by multiplying the torque on drive-side member 41 or the torque outputted from engine 30 by the gear ratio of primary speed reducing mechanism 36 (the number of teeth of driven-side primary reduction gear 36b/the number of teeth of drive-side primary reduction gear 36a). In turn, actual transmission torque Tac is described as torque transmitted to driven-side member 42 in the mechanism downstream of drive-side member 41.

At t1, when the rider operates accelerator grip 5a and thus the start-up conditions, to be discussed later, are satisfied, control unit 11 sets target transmission torque Ttg as request transmission torque Treq, which is determined according to accelerator displacement by the rider, as shown in FIG. 5(b). As shown in FIG. 5(c), at time t1 when accelerator grip 5a is operated, EG torque TEac increases. After that, as shown in FIGS. 5(a) and 5(c), control unit 11 actuates clutch actuator 14 according to the difference between target transmission torque Ttg and actual transmission torque Tac in order to gradually enhance the degree of engagement of clutch 40. Thereby, control unit 11 allows actual transmission torque Tac to approximate target transmission torque Ttg (request transmission torque Treq under this control). Then, at t2, actual transmission torque Tac reaches target transmission torque Ttg. After that, because the difference between actual transmission torque Tac and target transmission torque Ttg is almost eliminated, control unit 11 keeps the degree of engagement of clutch 40 approximately constant. After that, at t3, when the difference between the rotational speed of drive-side member 41 and the rotational speed of driven-side member 42 (hereinafter referred to as clutch rotational speed difference) falls below a predetermined value (hereinafter referred to as rotational speed difference for discontinuing half-clutch, for example, a value of 0 or close to 0), control unit 11 allows clutch 40 to be completely engaged.

As shown in FIG. 5(c), there is generally a difference between EG torque TEac and actual transmission torque Tac when clutch 40 is in a half-clutch state. If EG torque TEac is higher than actual transmission torque Tac, the difference therebetween contributes to an increase in engine speed; therefore, engine speed increases at a rate according to the difference. Thus, as shown in FIG. 5(c), when EG torque TEac increases at t1 and becomes higher than actual transmission torque Tac, engine speed increases. Then, as shown in FIG. 6 and FIG. 5(c), EG torque TEac outputted from engine 30 decreases as engine speed increases. Then, as shown in FIG. 5(c), at t3, EG torque TEac corresponds with actual transmission torque Tac that has already reached target transmission torque Ttg. In other words, EG torque TEac, actual transmission torque Tac, and request transmission torque Treq correspond with each other. Up to this point, the discussion has been made with its focus on the overview of request follow-up control and the changes in degree of engagement of clutch 40 and so forth with respect to time in the case when request follow-up control is performed.

If EG torque TEac is lower than actual transmission torque Tac, torque produced by the inertia of the internal mechanism of engine 30 such as crankshaft 34 (hereinafter referred to as inertia torque TIac) is transmitted as part of actual transmission torque Tac via clutch 40. Therefore, engine speed decreases. Thus, under this control, when EG torque TEac falls below actual transmission torque Tac, the engine speed switches from increasing to decreasing, and EG torque TEac thus starts increasing, thereby approaching actual transmission torque Tac. Consequently, in this operation range, when control is performed such that actual transmission torque Tac approximates target transmission torque Ttg, which is set at request transmission torque Treq, the engine speed converges to an engine speed Rreq at which torque equal to request transmission torque Treq is outputted as EG torque TEac (hereinafter the engine speed is referred to as request torque rotational speed) (see FIG. 6).

However, as under request follow-up control described above, target transmission torque Ttg is set as request transmission torque Treq, and clutch actuator 14 is actuated according to the difference between target transmission torque Ttg and actual transmission torque Tac, such control, depending on the operation range of engine 30, can cause engine speed to continue to increase or decrease without converging to a constant value or can require a long time period for the engine speed to converge to a constant value. For example, engine speed continues to increase or decrease in the operation range in which EG torque TEac increases, following the increase in engine speed (in the example of FIG. 4, this operation range is shown in a part of torque curve L1 where engine speed is lower than Rpeak, and is hereinafter referred to as torque-increasing operation range). The reasons for this event are described below.

Figure 7:
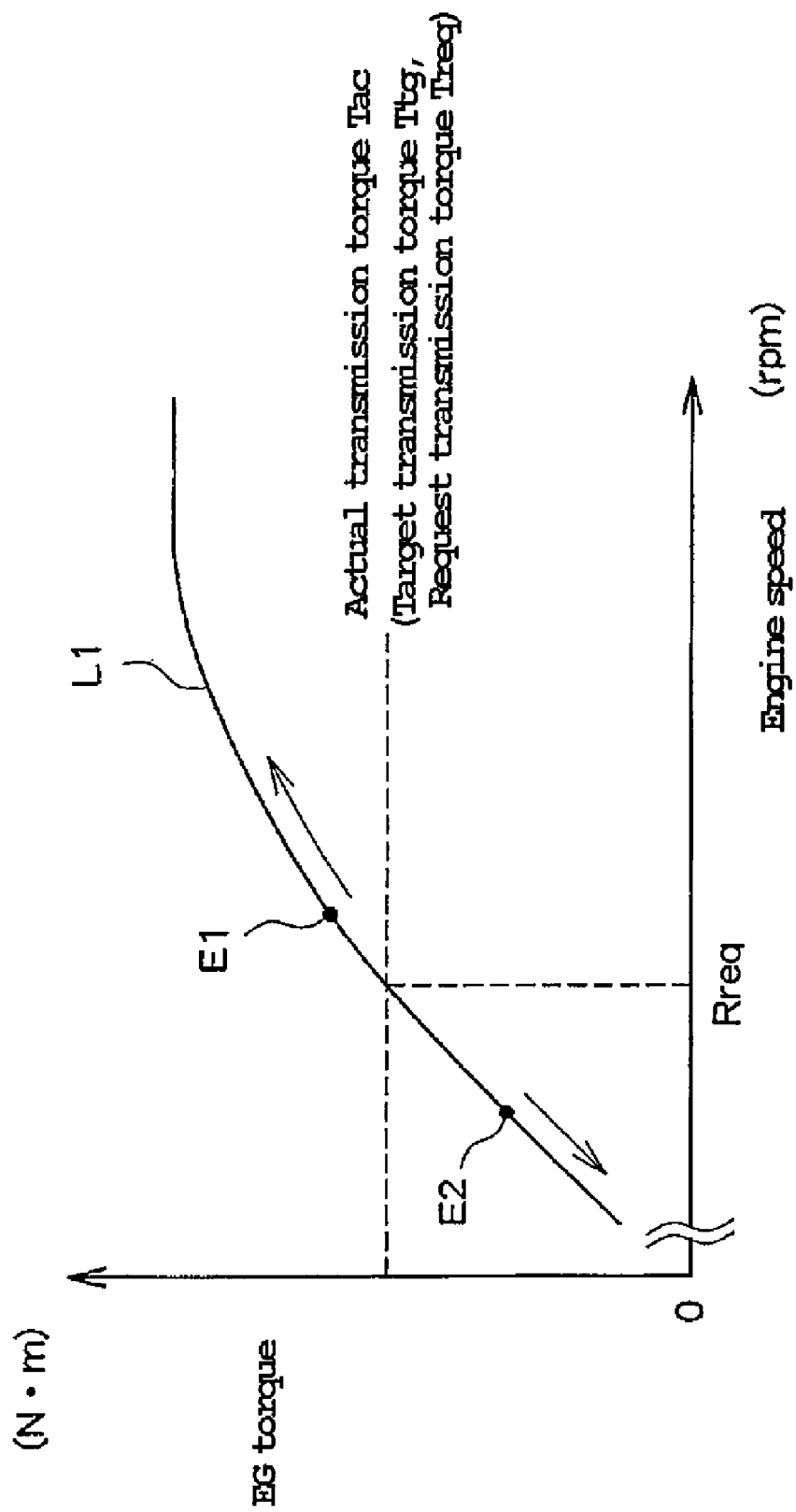
FIG. 7 illustrates changes in engine speed and engine torque when control is performed such that the actual transmission torque approximates the request transmission torque in the operation range in which the engine torque (EG torque) increases as the engine speed increases.

FIG. 7 illustrates changes in engine speed when the aforementioned control is performed in the torque-increasing operation range. In FIG. 7, the horizontal axis represents engine speed, and the vertical axis represents EG torque TEac. L1 in FIG. 7 is a part of torque curve L1 shown in FIG. 4, where engine speed is lower than Rpeak. Also, in FIG. 7, point E1 represents EG torque TEac that is higher than actual transmission torque Tac, and point E2 represents EG torque TEac that is lower than actual transmission torque Tac.

As described above, if EG torque TEac is higher than actual transmission torque Tac, engine speed increases. Thus, in this case, as shown by point E1 in FIG. 7, EG torque TEac further deviates from actual transmission torque Tac as engine speed increases so that engine speed continues to increase. Also as described above, if EG torque TEac is lower than actual transmission torque Tac, engine speed decreases. Thus, in this case, as shown by point E2 in FIG. 7, EG torque TEac further deviates from actual transmission torque Tac as engine speed decreases so that engine speed continues to decrease. Thus, where clutch 40 is controlled such that actual transmission torque Tac approximates request transmission torque Treq in the torque-increasing operation range, engine speed could become excessively high or low without converging to request torque rotational speed Rreq in this operation range, even if actual transmission torque Tac has reached request transmission torque Treq.

Therefore, in the torque-increasing operation range, control unit 11 performs to prevent engine speed from excessively increasing or decreasing, instead of request follow-up control. Specifically, if EG torque TEac is higher than request transmission torque Treq, control unit 11 actuates clutch actuator 14 such that actual transmission torque Tac approximates EG torque TEac (hereinafter this control is referred to as rotational speed maintaining control). For example, under rotational speed maintaining control, control unit 11 sets EG torque TEac as transmission torque Ttg and actuates clutch actuator 14 according to the difference between target transmission torque Ttg and actual transmission torque Tac, such that Tac approximates Ttg.

Figure 8:
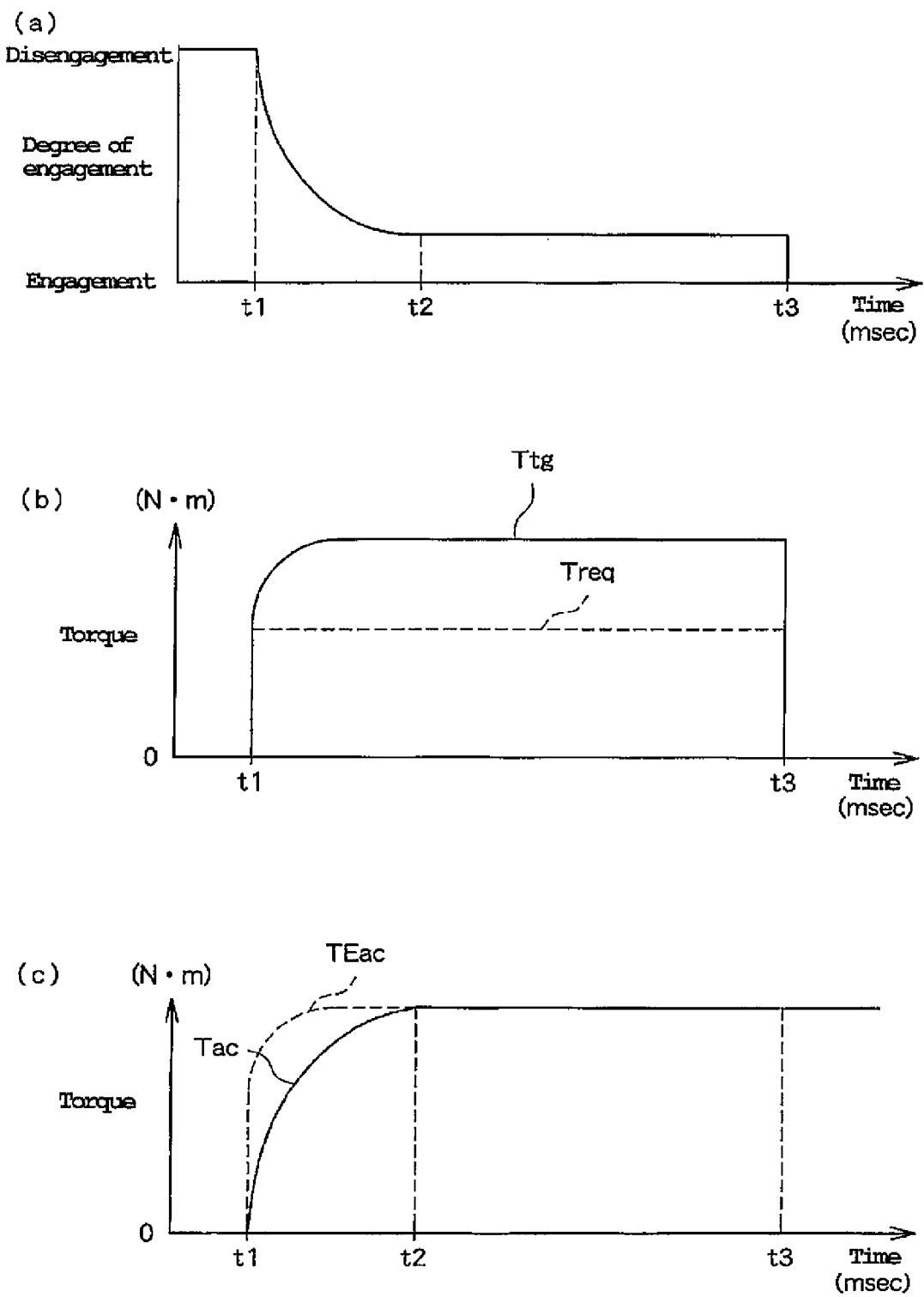
FIGS. 8(a)-8(c) are time charts respectively showing examples of changes in degree of engagement of the clutch, target transmission torque Ttg, actual transmission torque Tac, and EG torque TEac when rotational speed maintaining control is performed.
Figure 9:
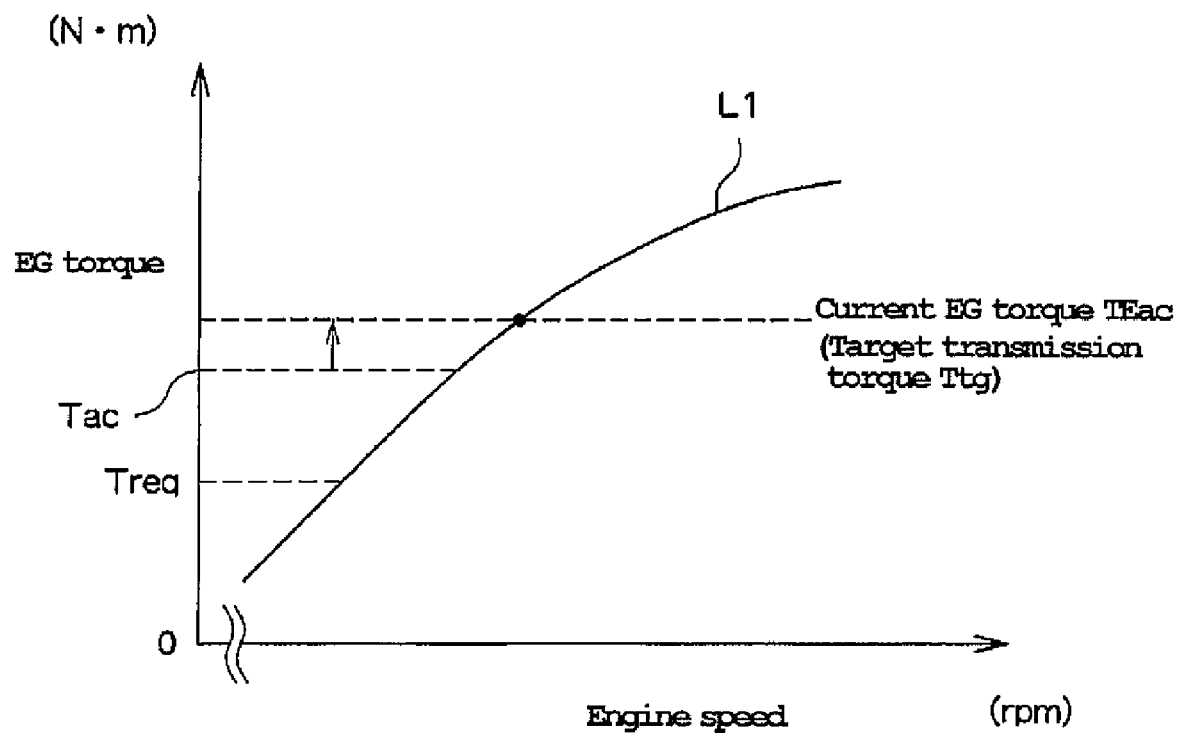
FIG. 9 illustrates changes in engine speed and EG torque TEac when rotational speed maintaining control is performed.

FIGS. 8(a)-(c) are time charts respectively showing examples of changes in degree of engagement of clutch 40, target transmission torque Ttg, actual transmission torque Tac, and of EG torque TEac when rotational speed maintaining control is performed. FIG. 8(a) shows the degree of engagement of clutch 40. FIG. 8(b) shows target transmission torque Ttg. FIG. 8(c) shows actual transmission torque Tac and EG torque TEac. In FIG. 8(b), request transmission torque Treq is shown by a broken line. FIG. 9 illustrates changes in engine speed and EG torque TEac when rotational speed maintaining control is performed. In FIG. 9, the horizontal axis represents engine speed, and the vertical axis represents EG torque. L1 in FIG. 9 is a part of torque curve L1 shown in FIG. 4, where engine speed is lower than Rpeak. FIG. 9 shows EG torque TEac at the point immediately before t2 in FIG. 8, and so forth.

At t1, when the rider operates accelerator grip 5a, and thus, the vehicle start-up conditions are satisfied, EG torque TEac increases as shown in FIG. 8(c). Then, if EG torque TEac exceeds request transmission torque Treq determined according to accelerator displacement, control unit 11 sets target transmission torque Ttg not at request transmission torque Treq but at EG torque TEac, as shown in FIG. 8(b). After that, as shown in FIGS. 8(a) and 8(c), control unit 11 actuates clutch actuator 14 according to the difference between target transmission torque Ttg (EG torque TEac in this example) and actual transmission torque Tac in order to gradually enhance the degree of engagement of clutch 40. Thereby, control unit 11 allows actual transmission torque Tac to approximate EG torque TEac. Consequently, as shown in FIG. 8(c), actual transmission torque Tac reaches EG torque TEac at t2. After that, at t3, when the clutch rotational speed difference falls below the rotational speed difference for discontinuing half-clutch, control unit 11 allows clutch 40 to be completely engaged.

As shown in FIG. 8(c), EG torque TEac increases at t1 and is thus higher than actual transmission torque Tac. Therefore engine speed keeps increasing from t1 onwards. Then, as shown in FIG. 9 and FIG. 8(c), in the torque-increasing operation range, EG torque TEac increases as engine speed increases. However, control unit 11 allows the difference between actual transmission torque Tac and EG torque TEac to be eliminated at point (t2) where actual transmission torque Tac reaches target transmission torque Ttg, and thus, engine speed stops increasing. Up to this point, the discussion has focused on the overview of the rotational speed maintaining control.

The control performed if engine 30 operates in the torque-increasing operation range, and if EG torque TEac is lower than request transmission torque Treq, is now described. In this case, control unit 11 actuates clutch actuator 14 such that engine speed increases to a predetermined engine speed (hereinafter this control is referred to as rotational speed induction control (second control)). Specifically, control unit 11 actuates clutch actuator 14 such that engine speed increases or decreases to an engine speed determined according to request transmission torque Treq. For example, control unit 11 sets target transmission torque Ttg such that either one of target transmission torque Ttg and request transmission torque Treq is higher than EG torque TEac while the other is lower than EG torque TEac. More specifically, if EG torque TEac is lower than request transmission torque Treq, control unit 11 sets target transmission torque Ttg at a value lower than EG torque TEac. In addition, control unit 11 allows target transmission torque Ttg to gradually approximate request transmission torque Treq during engaging operation of clutch 40.

Figure 11:
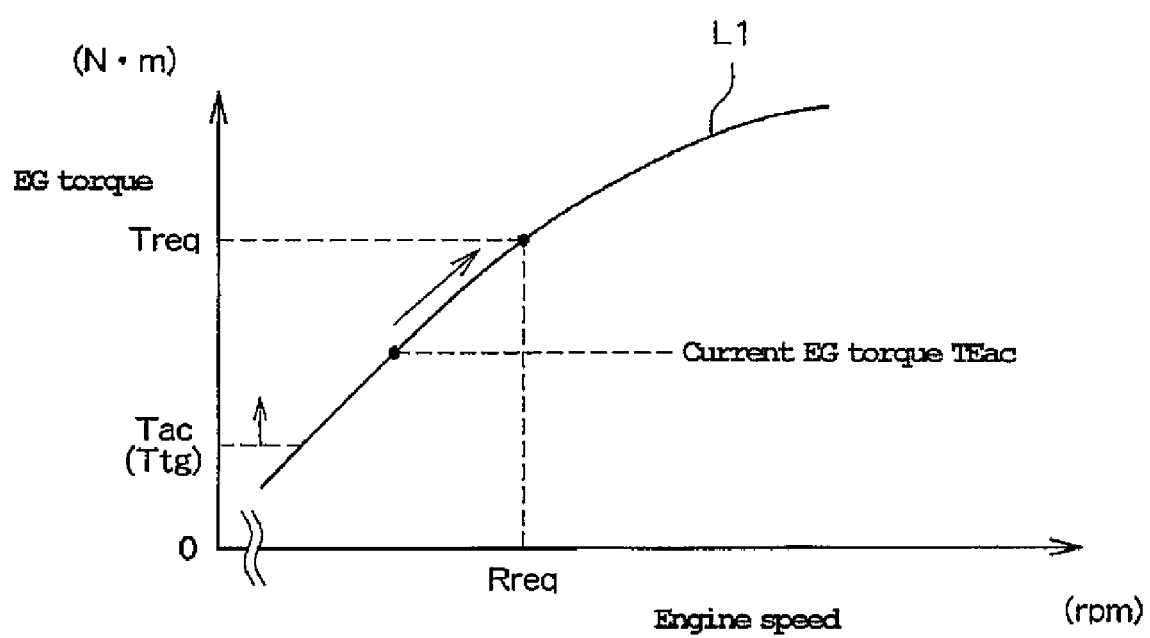
FIG. 11 illustrates changes in engine speed and EG torque TEac when rotational speed induction control is performed.

FIGS. 10(a)-(c) are time charts respectively showing examples of changes in degree of engagement of clutch 40, target transmission torque Ttg, request transmission torque Treq, EG torque TEac, and actual transmission torque Tac when rotational speed induction control is performed. FIG. 10(a) shows the degree of engagement of clutch 40. FIG. 10(b) shows target transmission torque Ttg, request transmission torque Treq and EG torque TEac. FIG. 10(c) shows actual transmission torque Tac and EG torque TEac. FIG. 11 is a graph illustrating changes in engine speed and EG torque when rotational speed induction control is performed. In FIG. 11, the horizontal axis represents engine speed, and the vertical axis represents EG torque. L1 in FIG. 11 is a part of torque curve L1 shown in FIG. 4, where engine speed is lower than Rpeak. In addition, FIG. 11 shows EG torque TEac and so forth from t2 onwards in FIGS. 10(a)-(c).

At t1, when the rider operates accelerator grip 5a and thus the vehicle start-up conditions are satisfied, EG torque TEac increases as shown in FIG. 10(c). Then, as shown in FIG. 10(b), unless EG torque TEac exceeds request transmission torque Treq determined according to accelerator displacement, control unit 11 performs rotational speed induction control. Specifically, control unit 11 sets target transmission torque Ttg at a value lower than EG torque TEac. Then, control unit 11 actuates clutch actuator 14 according to the difference between target transmission torque Ttg and actual transmission torque Tac. Thereby, as shown in FIGS. 10(a) and 10(c), control unit 11 enhances the degree of engagement of clutch 40 gradually in order to allow actual transmission torque Tac to approximate target transmission torque Ttg. Then, at t2, actual transmission torque Tac reaches target transmission torque Ttg.

As shown in FIG. 10(c), EG torque TEac increases at time t1 and becomes higher than actual transmission torque Tac, and thus, engine speed increases. Then, as shown in FIG. 11 and FIG. 10(c), in the torque-increasing operation range, EG torque TEac increases as engine speed increases. Under this control, control unit 11 sets target transmission torque Ttg at a value lower than EG torque TEac, while gradually increasing target transmission torque Ttg to request transmission torque Treq. Thus, from t2 onwards, actual transmission torque Tac follows target transmission torque Ttg, approximating request transmission torque Treq. Consequently, as shown in FIG. 10(b), at t3, request transmission torque Treq, target transmission torque Ttg, and EG torque TEac are equal to each other, and thus the difference is eliminated between actual transmission torque Tac and EG torque TEac. Thereby, the engine speed converges to an engine speed that is determined according to request transmission torque Treq (in this example, engine speed Rreq at which EG torque TEac is equal to the request transmission torque is outputted). Up to this point, the discussion has focused on the overview of the rotational speed induction control.

Figure 12:
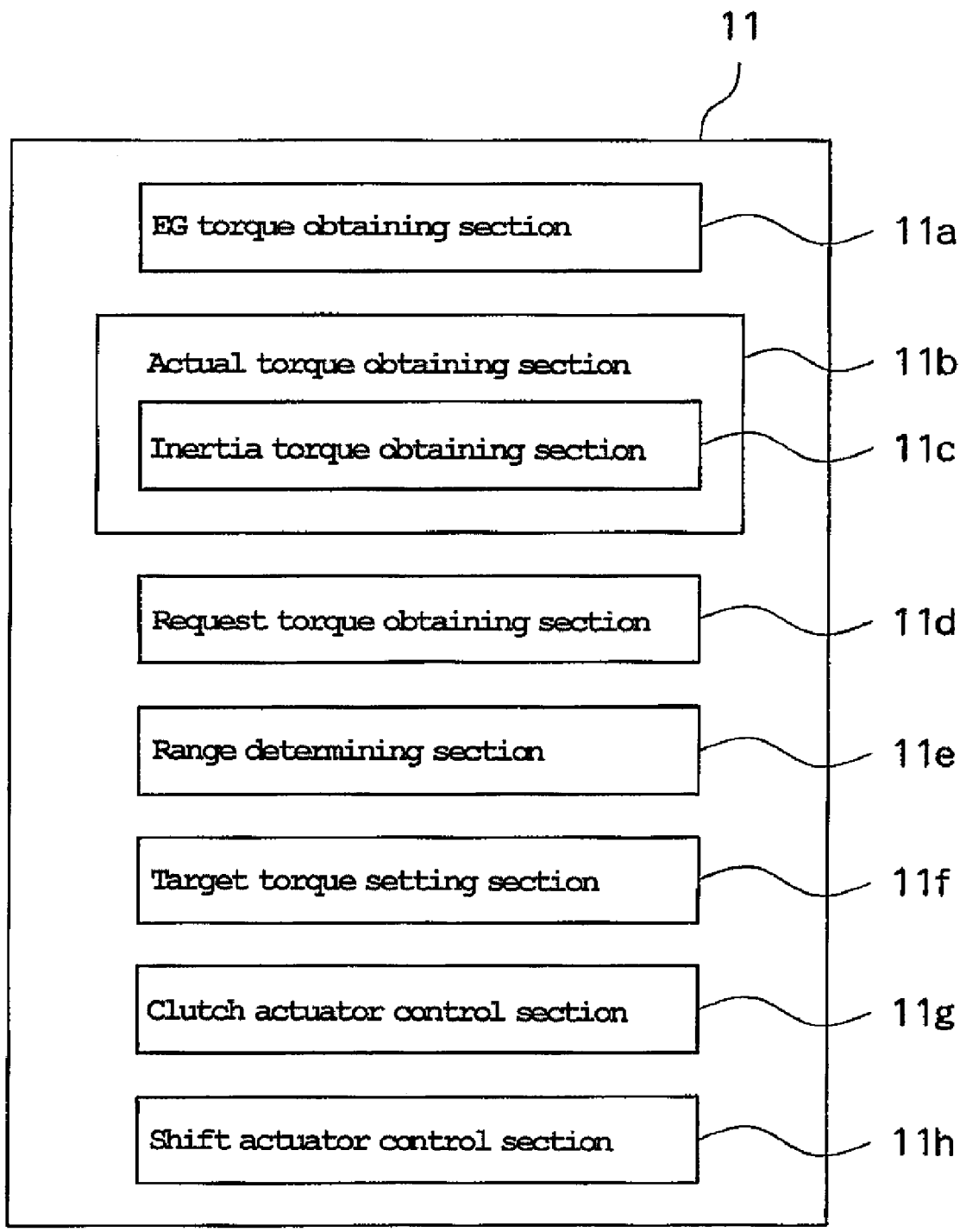
FIG. 12 is a block diagram illustrating the processing functions of the control unit.

The processing executed by control unit 11 is now discussed in detail. FIG. 12 is a block diagram illustrating the processing functions of control unit 11. As shown in FIG. 12, control unit 11 includes an EG torque obtaining section 11a, an actual torque obtaining section 11b, a request torque obtaining section 11d, a range determining section 11e, a target torque setting section 11f, a clutch actuator control section 11g and a shift actuator control section 11h. Actual torque obtaining section 11b includes an inertia torque obtaining section 11c.

The processing executed by EG torque obtaining section 11a is now described. EG torque obtaining section 11a executes processing for obtaining EG torque TEac currently outputted from engine 30. For example, storage unit 12 stores in advance a table that establishes the correspondence between EG torque TEac, and the engine speed and accelerator displacement (hereinafter the table is referred to as EG torque table). Then, EG torque obtaining section 11a detects accelerator displacement based on the signal inputted from accelerator operation detector 17, while detecting engine speed based on the signal inputted from engine speed detector 18. Then, EG torque obtaining section 11a refers to the EG torque table to obtain the EG torque TEac that corresponds to the detected accelerator displacement and engine speed. As mentioned above, EG torque TEac is obtained by multiplying the torque outputted from engine 30 by the gear ratio of primary speed reducing mechanism 36.

In place of the EG torque table, storage unit 12 may store an expression that represents the relationship between engine speed, accelerator displacement and EG torque TEac (hereinafter referred to as EG torque relational expression). In this case, EG torque obtaining section 11a substitutes the detected engine speed and accelerator displacement into the EG torque relational expression in order to calculate the current EG torque TEac.

Alternatively, EG torque obtaining section 11a may obtain EG torque TEac based on the pressure of air flowing through the interior of intake pipe 35 (hereinafter referred to as intake pressure). For example, storage unit 12 may store in advance a table that establishes the correspondence between EG torque TEac, and the intake pressure and engine speed. In addition, a pressure sensor for outputting a signal according to the intake pressure is disposed in intake pipe 35. In this case, EG torque obtaining section 11a detects the engine speed at the time when the crank angle is a predetermined value (for example, at the end of intake stroke), while detecting the intake pressure based on the signal inputted from the pressure sensor. Then, EG torque obtaining section 11a refers to the table stored in storage unit 12 to obtain the EG torque TEac that corresponds to the detected intake pressure and engine speed.

The processing executed by actual torque obtaining section 11b is now described. Actual torque obtaining section 11b executes processing for obtaining actual transmission torque Tac in a predetermined cycle (for example, several milliseconds) during engaging operation of clutch 40. Specifically, actual torque obtaining section 11b calculates actual transmission torque Tac based on the EG torque TEac obtained by EG torque obtaining section 11a and based on the torque produced due to the inertia of the mechanism (such as crankshaft 34, piston 32 and primary speed reducing mechanism 36) located upstream of drive-side member 41 in the torque transmission path (i.e. inertia torque TIac).

The processing for obtaining inertia torque TIac is first described. Inertia torque TIac is determined according to variation in engine speed $\Omega e$ per unit time ($d\Omega e/dt$, hereinafter referred to as rate-of-change of EG speed). Storage unit 12 stores in advance an expression that associates inertia torque TIac with the rate-of-change of EG speed ($d\Omega e/dt$). Specifically, storage unit 12 stores an expression, in which inertia torque TIac is equal to a value ($I \times (d\Omega e/dt)$) obtained by multiplying the inertial moment I on the mechanism upstream of drive-side member 41 by the rate-of-change of EG speed ($d\Omega e/dt$). In this case, inertia torque obtaining section 11c, included in actual torque obtaining section 11b, calculates the rate-of-change of EG speed ($d\Omega e/dt$) based on the signal inputted from engine speed detector 18. Then, inertia torque obtaining section 11c multiplies the rate-of-change of EG speed ($d\Omega e/dt$) by the inertial moment I, and defines the multiplication result ($I \times (d\Omega e/dt)$) as inertia torque TIac. Storage unit 12 may store in advance a table that establishes the correspondence between the rate-of-change of EG speed (dΩe/dt) and inertia torque TIac. In this case, inertia torque obtaining section 11c refers to the table to obtain the inertia torque TIac that corresponds to the rate-of-change of EG speed (dΩe/dt).

Actual torque obtaining section 11a assigns EG torque TEac and inertia torque TIac, which are obtained from the aforementioned processing, to the expression that is stored in storage unit 12 and represents the relationship between EG torque TEac, inertia torque TIac and actual transmission torque Tac in order to calculate actual transmission torque Tac. For example, actual torque obtaining section 11b assigns inertia torque TIac and EG torque TEac to the following expression (1), and defines the obtained value as actual transmission torque Tac.

$$Tac = TEac - TIac \qquad (1)$$

Actual transmission torque Tac is described herein as torque transmitted to driven-side member 42. However, for example, actual torque obtaining section 11b may calculate torque transmitted to countershaft 55 or the mechanism downstream of countershaft 55 as actual transmission torque Tac. In this case, actual torque obtaining section 11b obtains torque by multiplying the value obtained from expression (1) by the deceleration ratio of gearbox 51 (the gear ratio of the shift gears after shifted-up or shifted-down operation (after clutch 40 is completely engaged)) and by the deceleration ratio of transmission mechanism 57, and defines the obtained torque as actual transmission torque Tac.

When the torque produced on the mechanism upstream of primary speed reducing mechanism 36 is stored as EG torque TEac in the EG torque table, actual torque obtaining section 11b multiplies EG torque TEac, which is obtained from the aforementioned processing, by the deceleration ratio of primary speed reducing mechanism 36 (the number of teeth of driven-side primary reduction gear 36b/the number of teeth of drive-side primary reduction gear 36a) in order to calculate the actual transmission torque Tac.

The processing for calculating actual transmission torque Tac is not limited to these processes. For example, storage unit 12 may store a table or an expression that establishes the correspondence between actual transmission torque Tac, and engine speed, accelerator displacement and the rate-of-change of EG speed. In this case, actual torque obtaining section 11b uses the table or expression to directly obtain actual transmission torque Tac from the engine speed, the rate-of-change of EG speed and accelerator displacement.

The processing executed by request torque obtaining section 11d is now described. Request torque obtaining section 11d executes processing for obtaining request transmission torque Treq based on the accelerator displacement detected by accelerator operation detector 17. For example, storage unit 12 stores in advance a table that establishes the correspondence between accelerator displacement by the rider and request transmission torque Treq (hereinafter referred to as the request torque table). Request torque obtaining section 11d then refers to the request torque table to obtain the request transmission torque Treq that corresponds to the accelerator displacement detected by accelerator operation detector 17. Alternatively, storage unit 12 may store an expression that represents the relationship between the accelerator displacement and request transmission torque Treq. In this case, request torque obtaining section 11d assigns the accelerator displacement detected by accelerator operation detector 17 to the expression in order to calculate request transmission torque Treq.

Figure 13:
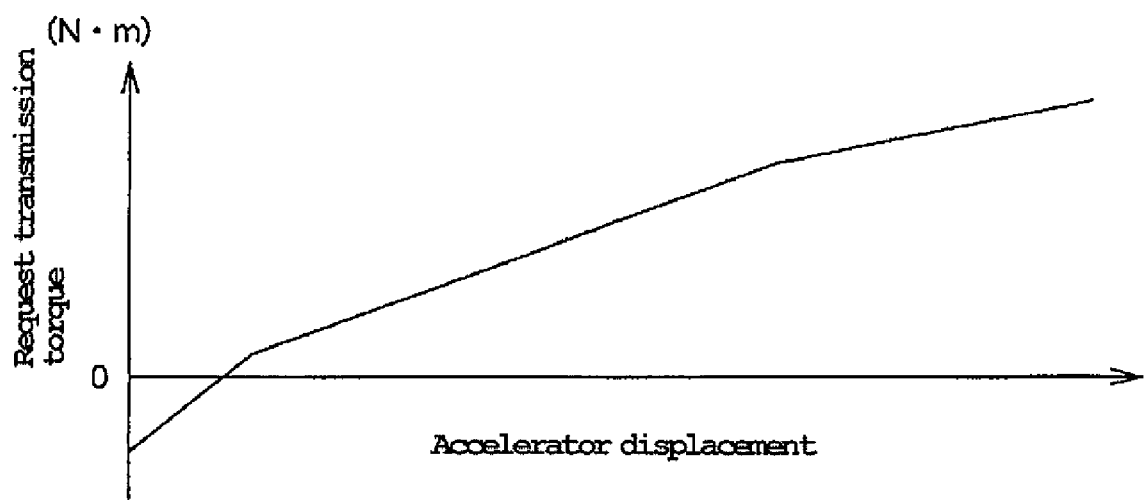
FIG. 13 is a graph showing an example of the relationship between request transmission torque Treq and accelerator displacement.

FIG. 13 is a graph that indicates an example of the relationship between request transmission torque Treq and accelerator displacement. The horizontal axis represents accelerator displacement, and the vertical axis represents request transmission torque Treq. As shown in FIG. 13, as accelerator displacement becomes larger, request transmission torque Treq increases. In addition, when accelerator displacement is 0, request transmission torque Treq is a negative value.

The processing executed by range determining section 11e is now described. Range determining section 11e determines whether or not engine 30 operates in the torque-decreasing operation range or in the torque-increasing operation range. Range determining section 11e executes this processing as described below, for example.

Storage unit 12 stores in advance an operation range information correspondence table showing that each operation range, which is specified by accelerator displacement and engine speed, is either the torque-increasing operation range or information indicative of the torque-decreasing operation range (hereinafter referred to as the range determining table). FIG. 14 shows an example of the range determining table, which stores engine speed on the top row and accelerator displacement on the leftmost column, both of which specify the operation range. In addition, the range determining table stores, for each operation range specified by accelerator displacement and engine speed, information indicating that the operation range is either the torque-increasing operation range or the torque-decreasing operation range. In FIG. 14, for example, in the operation range with 3000 rpm engine speed and 100% accelerator displacement, information indicating that this operation range is the torque-increasing operation range ("increase" in FIG. 14) is stored. In turn, in the operation range with 9000 rpm engine speed and 5% accelerator displacement, information indicating that this operation range is the torque-decreasing operation range ("decrease" in FIG. 14) is stored. When storage unit 12 stores such a range determining table, range determining section 11e refers to the range determining table to determine whether the operation range that corresponds to the accelerator displacement and the engine speed detected by the respective detectors is the torque-increasing operation range or the torque-decreasing operation range.

Alternatively, before or during the engaging operation of clutch 40, range determining section 11e may estimate whether or not EG torque TEac approximates request transmission torque Treq when request follow-up control is performed, and determine the current operation range based on the estimation result. Specifically, if EG torque TEac is estimated to approximate request transmission torque Treq, range determining section 11e determines that the current operation range is the torque-decreasing operation range. In contrast, if EG torque TEac is estimated to deviate from request transmission torque Treq, range determining section 11e determines that the current operation range is the torque-increasing operation range. This processing is executed as described below, for example.

Range determining section 11e refers to the EG torque table to obtain the engine speed, at which the torque that is equal to the request transmission torque is outputted as EG torque TEac, that is, request torque rotational speed Rreq. FIG. 15 shows an example of the EG torque table. In this table, engine speed is listed on the top row and accelerator displacement is listed in the leftmost column. The table also establishes the correspondence between each engine speed and accelerator displacement, and EG torque TEac. When storage unit 12 stores such an EG torque table and, for example, the accelerator displacement is 75% and request transmission torque Treq is 1.00, range determining section 11e refers to this EG torque table and obtains the request torque rotational speed Rreq of 6050 rpm.

Range determining section 11e also estimates the tendency of changes in engine speed when request follow-up control is performed. Specifically, if request transmission torque Treq is higher than EG torque TEac, actual transmission torque Tac made higher than EG torque TEac accordingly by request follow-up control. Therefore, range determining section 11e estimates that engine speed decreases. In contrast, if request transmission torque Treq is lower than EG torque TEac, range determining section 11e estimates that engine speed increases under request follow-up control.

Then, if the current engine speed increases or decreases as estimated, range determining section 11e determines whether or not the current engine speed approximates request torque rotational speed Rreq. For example, if the current engine speed is 5000 rpm and is estimated to increase, this engine speed approximates request torque rotational speed Rreq (6050 rpm in the aforementioned example) (see FIG. 15). In this case, because EG torque TEac also approximates request transmission torque Treq (1.00 in the aforementioned example), range determining section 11e determines that engine 30 currently operates in the torque-decreasing operation range. In contrast, if the engine speed is estimated to decrease, the engine speed deviates from request torque rotational speed Rreq (6050 rpm in the aforementioned example), and accordingly, EG torque TEac deviates from request transmission torque Treq (see FIG. 15). In this case, range determining section 11e determines that engine 30 operates in the torque-increasing operation range.

Target torque setting section 11f is now described. Target torque setting section 11f sets the target transmission torque according to the determination result made by range determination section 11e. Specifically, if engine 30 operates in the torque-decreasing operation range, target torque setting section 11f regards request transmission torque Treq obtained by processing of request torque obtaining section 11d as target transmission torque Ttg.

In turn, if engine 30 operates in the torque-increasing operation range, target torque setting section 11f sets target transmission torque Ttg depending on a positive or negative value of the difference between EG torque TEac and request transmission torque Treq. Specifically, if EG torque TEac is higher than request transmission torque Treq, target torque setting section 11f sets target transmission torque Ttg as EG torque TEac.

In contrast, if EG torque TEac is lower than request transmission torque Treq, target torque setting section 11f sets a value lower than EG torque Teac as target transmission torque Ttg. In addition, target torque setting section 11f gradually reduces the difference between target transmission torque Ttg and request transmission torque Treq during engaging operation of clutch 40. Specifically, target torque setting section 11f determines the difference between target transmission torque Ttg and EG torque TEac according to that between EG torque TEac and request transmission torque Treq. For example, target torque setting section 11f calculates target transmission torque Ttg by assigning EG torque TEac, which is obtained by the processing of EG torque obtaining section 11a, and request transmission torque Treq, which is obtained by the processing of request torque obtaining section 11d, to the following expression (2) stored in storage unit 12 in advance.

$$Ttg = TEac - (Treq - TEac) \quad (2)$$

When target transmission torque Ttg is set in this manner, target transmission torque Ttg approximates request transmission torque Treq gradually during engaging operation of clutch 40. In other words, as described by referring to FIGS. 10(a)-(c) and 11, actual transmission torque Tac reaches target transmission torque Ttg during engaging operation of clutch 40. Therefore, when target transmission torque Ttg is lower than EG torque TEac, actual transmission torque Tac also turns out to be lower than EG torque TEac. Thus, engine speed increases. In the torque-increasing operation range, EG torque TEac increases as engine speed increases. Thus, the difference between EG torque TEac and request transmission torque Treq is gradually reduced during engaging operation of clutch 40; therefore, target transmission torque Ttg also gradually approximates request transmission torque Treq.

The processing executed by target torque setting section 11f is not limited to this example. For example, a maximum value ΔTmax of the difference between EG torque TEac and target transmission torque Ttg may be given. If the difference between request transmission torque Treq and EG torque TEac exceeds maximum value ΔTmax, target torque setting section 1 if does not necessarily set target transmission torque Ttg by assigning EG torque TEac and request transmission torque Treq to expression (2). Alternatively, target torque setting section 11f may set a value obtained by subtracting maximum value ΔTmax from EG torque TEac (TEac−ΔTmax) as target transmission torque Ttg.

The processing executed by clutch actuator control section 11g is now described. During engaging operation of clutch 40, clutch actuator control section 11g actuates clutch actuator 14 in a predetermined cycle based on the difference between actual transmission torque Tac and target transmission torque Ttg (hereinafter referred to as torque deviation). Specifically, clutch actuator control section 11g actuates clutch actuator 14 by an amount according to the torque deviation to allow actual transmission torque Tac to approximate target transmission torque Ttg. Clutch actuator control section 11g executes the following processing, for example.

Storage unit 12 stores in advance an expression (hereinafter referred to as the actuation amount relational expression) that represents the relationship between the torque deviation (Ttg−Tac) and the amount by which clutch actuator 14 is actuated (hereinafter referred to as the command actuation amount). Clutch actuator control section 11g calculates the torque deviation (Ttg−Tac) in a predetermined cycle during engaging operation of clutch 40. Then, clutch actuator control section 11g substitutes the torque deviation (Ttg−Tac) into the actuation amount relational expression in order to calculate the command actuation amount, and outputs a control signal to clutch actuator drive circuit 13 according to the calculated command actuation amount. Clutch actuator drive circuit 13 outputs electric power to drive clutch actuator 14 according to the control signal.

Figure 16:
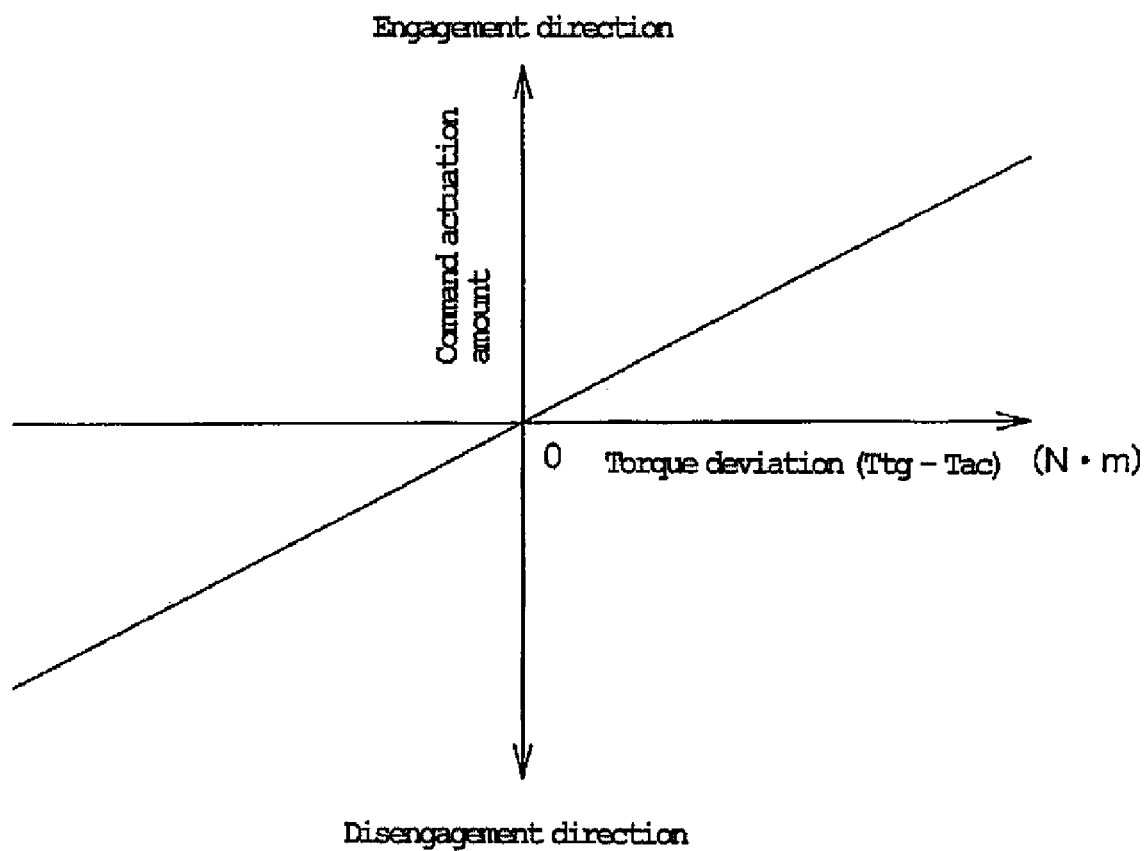
FIG. 16 is a graph showing an example of the relationship between the command actuation amount and the torque deviation.

FIG. 16 is a graph showing the relationship between the torque deviation (Ttg−Tac) and the command actuation amount obtained from the actuation amount relational expression. In an example shown in FIG. 16, the actuation amount relational expression is established such that if the torque deviation (Ttg−Tac) is positive, clutch actuator 14 is actuated in the direction to engage clutch 40. In turn, the actuation amount relational expression is established such that if the torque deviation (Ttg−Tac) is negative, clutch actuator 14 is actuated in the direction to disengage clutch 40. In addition, the actuation amount relational expression is established such that the command actuation amount increases in proportion to the torque deviation (Ttg−Tac).

Figure 17:
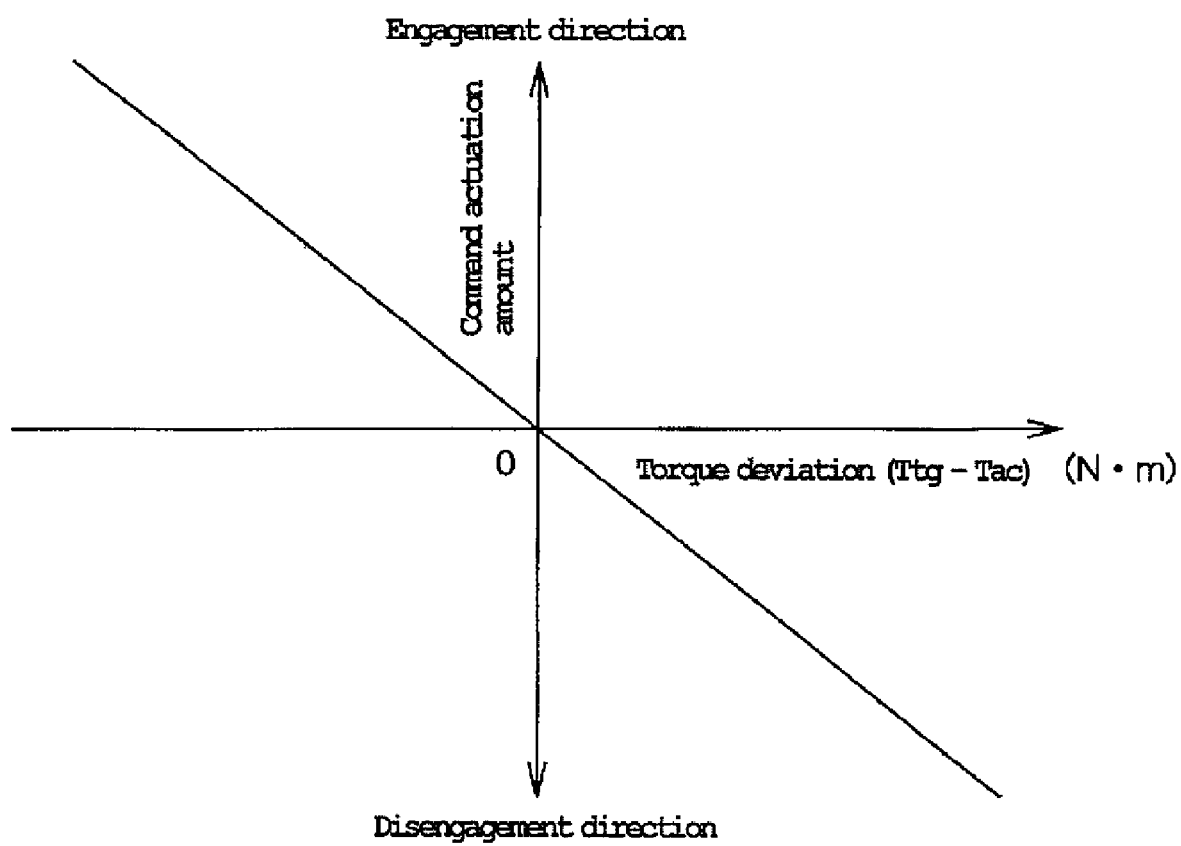
FIG. 17 is a graph showing another example of the relationship between the command actuation amount and the torque deviation.

Storage unit 12 stores the actuation amount relational expressions. One expression is to actuate clutch actuator 14 in the direction to engage clutch 40 when the torque deviation (Ttg−Tac) is positive as shown in FIG. 16 (hereinafter referred to as the engagement actuation amount relational expression). The other expression is to actuate clutch actuator 14 in the opposite direction from or the direction to disengage clutch 40 (hereinafter referred to as the disengagement actuation amount relational expression). FIG. 17 is a graph showing the relationship between the torque deviation (Ttg−Tac) and the command actuation amount obtained from the disengagement actuation amount relational expression. In the graph shown in FIG. 17, the actuation amount relational expression is established such that if the torque deviation (Ttg−Tac) is positive, clutch actuator 14 is actuated in the direction to disengage clutch 40, in contrast to the graph shown in FIG. 16.

Clutch actuator control section 11g selects either the engagement actuation amount relational expression or the disengagement actuation amount relational expression depending on a positive or negative value of the difference in clutch rotational speed (rotational speed of drive-side member 41—rotational speed of driven-side member 42). Specifically, if the difference in clutch rotational speed is positive, clutch actuator control section 11g assigns the torque deviation (Ttg−Tac) to the engagement actuation amount relational expression. In contrast, if the difference in clutch rotational speed is negative, clutch actuator control section 11g assigns the torque deviation (Ttg−Tac) to the disengagement actuation amount relational expression.

Alternatively, instead of the engagement and disengagement actuation amount relational expressions, storage unit 12 may store a table that establishes the correspondence between the command actuation amount, and target transmission torque Ttg and actual transmission torque Tac. In this case, clutch actuator control section 11g refers to the table to directly obtain the command actuation amount that corresponds to target transmission torque Ttg and actual transmission torque Tac, rather than calculating the difference between target transmission torque Ttg and actual transmission torque Tac.

When the difference in clutch rotational speed is below the rotational speed difference for discontinuing half-clutch as a result of the aforementioned control based on the torque deviation, clutch actuator control section 11g further actuates clutch actuator 14 to completely engage clutch 40.

The processing executed by shift actuator control section 11h is now described. When the rider operates shift-up switch 9a or shift-down switch 9b to input a gear shift command from the switch button, shift actuator control section 11h actuates shift actuator 16 to change shift gears 53a, 53b, 54a, 54b. When shift-up switch 9a or shift-down switch 9b is turned ON, shift actuator control section 11h outputs a control signal to shift actuator drive circuit 15 at start-up of motorcycle 1 and in the state where clutch 40 is disengaged and gearbox 51 is set in the neutral position. Shift actuator 16 is actuated by driving power supplied from shift actuator drive circuit 15 in order to move some of shift gears 53a, 53b, 54a, 54b.

Figure 18:
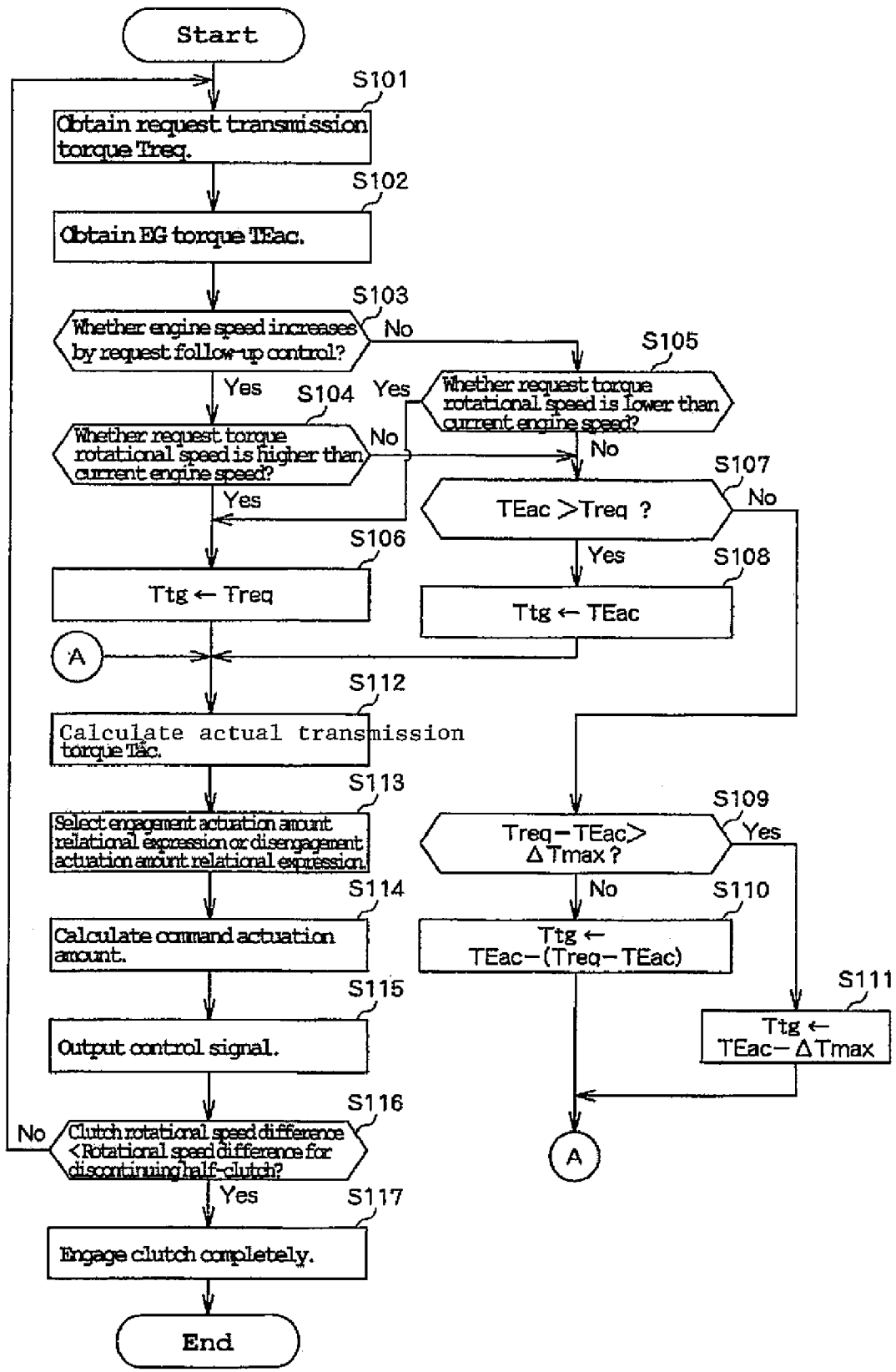
FIG. 18 is a flowchart showing an example of processing steps executed by the control unit.

The flow of processing executed by control unit 11 is now described. FIG. 18 is a flowchart showing an example of processing executed by control unit 11 at start-up of motorcycle 1. The processing described herein starts when the vehicle start-up conditions are satisfied. The vehicle start-up conditions are, for example, that clutch 40 is disengaged with gearbox 51 set in a position other than neutral position; and that engine speed and accelerator displacement are equal to or greater than their respective predetermined values. Alternatively, the start-up conditions may be that clutch 40 is disengaged with gearbox 51 set in a position other than neutral position; and that a value obtained by subtracting driven-side member 42 from drive-side member 41 of clutch 40, is a negative value.

If the vehicle start-up conditions are satisfied, request torque obtaining section 11d first detects accelerator displacement, and then refers to the request torque table (see FIG. 13) to obtain the request transmission torque Treq that corresponds to the detected accelerator displacement (step S101). In addition, EG torque obtaining section 11a detects the engine speed and obtains EG torque TEac based on the detected engine speed and accelerator displacement (step S102).

After that, range determining section 11e estimates whether or not EG torque TEac approximates request transmission torque Treq when request follow-up control is performed, and according to the estimation result, determines the current operation range of engine 30 (steps S103-S105). Specifically, range determining section 11e determines whether or not engine speed increases when request follow-up control is performed (step S103). In other words, range determining section 11e determines whether or not the difference between EG torque TEac and request transmission torque Treq (TEac−Treq) is greater than 0. If the difference is greater than 0, range determining section 11e determines that the engine speed increases and whether or not request torque rotational speed Rreq is higher than the current engine speed (step S104). If request torque rotational speed Rreq is higher than the current engine speed, EG torque TEac should approximate request transmission torque Treq due to the action of the request follow-up control. Therefore, range determining section 11e determines that engine 30 is currently operating in the torque-decreasing operation range. In this case, the processing of control unit 11 continues to step S106. In contrast, in step S104, if request torque rotational speed Rreq is lower than the current engine speed, EG torque TEac deviates from request transmission torque Treq due to the action of the request follow-up control. Therefore, range determining section 11e determines that engine 30 is currently operating in the torque-increasing operation range. In this case, the processing of control unit 11 continues to step S107.

In addition, in step S103, if the engine speed is determined to decrease when request follow-up control is performed (if the difference (TEac−Treq) is smaller than 0), range determining section 11e determines whether or not request torque rotational speed Rreq is lower than the current engine speed (step S105). If request torque rotational speed Rreq is lower than the current engine speed, EG torque TEac should naturally approximate request transmission torque Treq due to the action of the request follow-up control. Therefore, range determining section 11e determines that engine 30 is currently operating in the torque-decreasing operation range. Control unit 11 then goes to step S106 to continue processing. In contrast, in step S105, if request torque rotational speed Rreq is determined to be higher than the current engine speed, EG torque TEac deviates from request transmission torque Treq due to the action of the request follow-up control. Therefore, range determining section 11e determines that engine 30 operates in the torque-increasing operation range. In this case, control unit 11 goes to step S107 to continue processing.

As a result of steps S104 and S105, if range determining section 11e determines that the current operating condition of engine 30 falls within the torque-decreasing operation range, target torque setting section 11f sets target transmission torque Ttg as request transmission torque Treq obtained in step S101 (step S106). Thereby, request follow-up control is performed under which actual transmission torque Tac follows request transmission torque Treq.

In contrast, if range determining section 11e determines in steps S104 and S105 that the current operating condition of engine 30 falls within the torque-increasing operation range, target torque setting section 11f determines whether or not EG torque TEac obtained in step S102 is higher than request transmission torque Treq obtained in step S101 (step S107). If EG torque TEac is higher than request transmission torque Treq, target torque setting section 11f sets target transmission torque Ttg as EG torque TEac obtained in step S102 (step S108). Thereby, rotational speed maintaining control is performed in which actual transmission torque Tac follows the EG torque TEac.

In contrast, if EG torque TEac is not higher than request transmission torque Treq in step S107, target torque setting section 11f executes the following processing to perform rotational speed induction control. More specifically, target torque setting section 11f determines whether or not the difference between EG torque TEac and request transmission torque Treq (Treq−TEac) is higher than maximum value ΔTmax (step S109). If the difference (Treq−TEac) is larger than maximum value ΔTmax, target torque setting section 11f subtracts maximum value ΔTmax from EG torque TEac and sets the obtained value as target transmission torque Ttg (TEac−ΔTmax) (step S111). In contrast, if the difference (Treq−TEac) is not larger than maximum value ΔTmax, target torque setting section 11f substitutes EG torque TEac, which is obtained in step S102, and request transmission torque Treq, which is obtained in step S101, into expression (2), in order to calculate target transmission torque Ttg (step S110).

When target transmission torque Ttg is set in step S106, S108, S110 or S111, actual transmission torque obtaining section 11b calculates actual transmission torque Tac (step S112). Then, clutch actuator control section 11g determines whether or not the clutch rotational speed difference is a positive value and, based on the determination result, selects either the engagement or disengagement actuation amount relational expression (step S113). Clutch actuator control section 11g then calculates the command actuation amount based on the difference between target transmission torque Ttg and actual transmission torque Tac (that is, the torque deviation) (step S114). If the clutch rotational speed difference is negative, clutch actuator control section 11g assigns the torque deviation (Ttg−Tac) to the disengagement actuation amount relational expression in order to calculate the command actuation amount. In contrast, if the clutch rotational speed difference is positive, clutch actuator control section 11g assigns the torque deviation to the engagement actuation amount relational expression in order to calculate the command actuation amount. Then, clutch actuator control section 11g outputs a control signal to clutch actuator drive circuit 13 according to the command actuation amount (step S115). Thereby, clutch actuator 14 is actuated for the command actuation amount, so that the degree of engagement of clutch 40 changes.

Next, clutch actuator control section 11g recalculates the clutch rotational speed difference, and determines whether or not the recalculated clutch rotational speed difference is smaller than the rotational speed difference for discontinuing half-clutch (step S116). If the clutch rotational speed difference is smaller than the rotational speed difference for discontinuing half-clutch, clutch actuator control section 11g allows clutch 40 to be completely engaged (step S117). In contrast, if the clutch rotational speed difference is not smaller than the rotational speed difference for discontinuing half-clutch, control unit 11 returns to step S101 to repeat the subsequent steps in a predetermined cycle (for example, several milliseconds) until clutch 40 is completely engaged in step S117. The aforementioned processing is an example of processing executed by control unit 11 at vehicle start-up.

In the above-mentioned clutch controller 10, control unit 11 performs request follow-up control or actuates clutch actuator 14 based on the difference between actual transmission torque Tac and target transmission torque Ttg at which request transmission torque Treq is set, such that Tac approximates Ttg. This allows appropriate torque to be transmitted to the downstream side via the clutch during engaging operation of the clutch. In turn, in the torque-increasing operation range, control unit 11 performs rotational speed induction control or actuates clutch actuator 14 such that engine speed increases or decreases to a predetermined engine speed (the request torque rotational speed in the above description). This prevents engine speed from excessively increasing or decreasing in the torque-increasing operation.

Further, in clutch controller 10, actual torque obtaining section 11b calculates actual transmission torque Tac based on EG torque TEac and inertia torque TIac produced due to the inertia of the mechanism upstream of drive-side member 41 in the torque transmission path. Actual transmission torque Tac is thus obtained without providing any specific sensor for outputting a signal according to actual transmission torque Tac.

Still further, in clutch controller 10, the predetermined engine speed depends on request transmission torque Treq. This allows control unit 11 to perform control such that EG torque TEac approximates request transmission torque Treq with request by the rider.

Moreover, in clutch controller 10, control unit 11 includes target torque setting section 11f for setting the torque that is supposed to be transmitted from drive-side member 41 to the downstream mechanism as target transmission torque Ttg. Under rotational speed induction control, target torque setting section 11f sets target transmission torque Ttg such that either target transmission torque Ttg or request transmission torque Treq is higher than EG torque TEac, while the other is lower than EG torque TEac. Thus, under rotational speed induction control, control unit 11 actuates clutch actuator 14 based on the difference between actual transmission torque Tac and target transmission torque Ttg, such that Tac approximates Ttg. Under request follow-up control, control unit 11 controls clutch actuator 14 based on the difference between actual transmission torque Tac and target transmission torque Ttg which is set at request transmission torque Treq. Also under rotational speed induction control as described above, control unit 11 actuates clutch actuator 14 based on the difference between actual transmission torque Tac and target transmission torque Ttg. Therefore, control unit 11 can execute similar processing under request follow-up control and rotational speed induction control and simplify the processing for controlling the clutch. According to this embodiment, target torque setting section 11f sets target transmission torque Ttg based on the difference between EG torque TEac and request transmission torque Treq. This enables control such that target transmission torque Ttg more approximates EG torque TEac as the difference is smaller between EG torque TEac and request transmission torque Treq. Then, due to execution of such control, EG torque TEac approximates request transmission torque Treq at a slower pace as the difference becomes smaller between EG torque TEac and request transmission torque Treq. This prevents rapid changes in engine speed.

In addition, according to one embodiment of clutch controller 10, control unit 11 includes range determining section 11e for determining whether or not engine 30 operates in an operation range in which EG torque TEac increases as engine speed increases. Thus, range determining section 11e determines whether or not engine 30 operates in an operation range in which EG torque TEac increases as engine speed increases based on whether or not EG torque TEac approximates request transmission torque Treq when request follow-up control is performed. This ensures that rotational speed induction control is performed in an operation range in which EG torque TEac does not approximate request transmission torque Treq.

The present invention is not limited to clutch controller 10 as described herein and can have various alternatives. For example, in the above description, if the current operating condition of engine 30 falls within the torque-increasing operation range, and the detected EG torque TEac is higher than request transmission torque Treq, control unit 11 performs rotational speed maintaining control in which target transmission torque Ttg is set as the detected EG torque TEac. However, if the current operating condition of engine 30 falls within the torque-increasing operation range, and the engine speed falls outside a predetermined range, target torque setting section 11f may perform rotational speed maintaining control. In addition, target torque setting section 11f may set target transmission torque Ttg by means of similar processing under the aforementioned rotational speed induction control, unless the engine speed falls outside the predetermined range.

Figure 19:
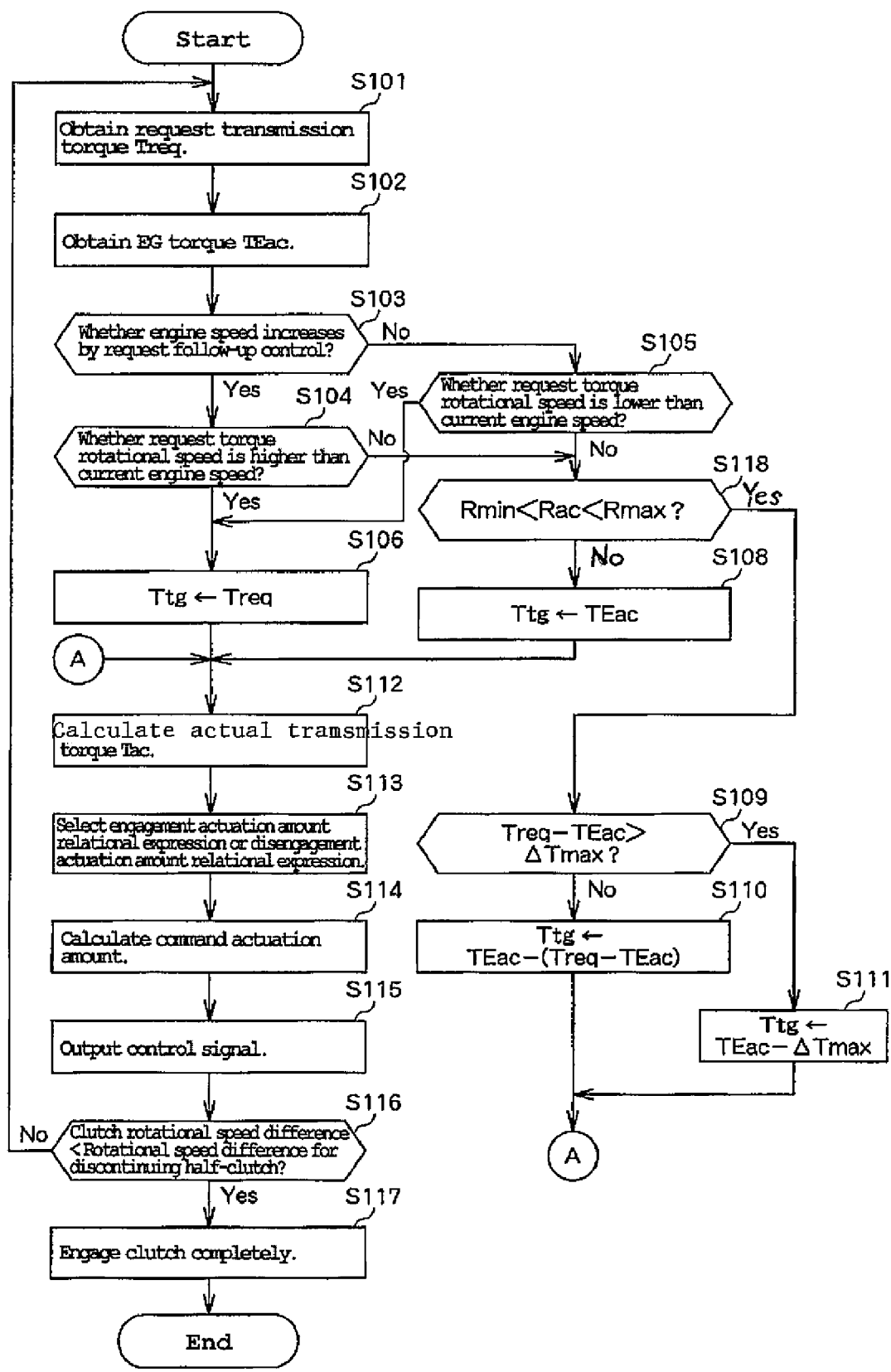
FIG. 19 is a flowchart showing another example of processing steps executed by the control unit.

FIG. 19 is a flowchart showing an example of processing executed by control unit 11 according to the embodiment of the invention. In FIG. 19, processing steps in common with those of FIG. 18 are designated by the same numerals, and the description thereof is not repeated.

In this embodiment, as shown in FIG. 19, if steps S103-S105 determine that the current operating condition of engine 30 falls within the torque-increasing operation range, target torque setting section 11f calculates engine speed Rac based on the signal of engine speed detector 18. Then, target torque setting section 11f determines whether or not the calculated engine speed Rac is higher than a predetermined minimum value Rmin and also is lower than a predetermined maximum value Rmax (step S118). In this step, minimum value Rmin and maximum value Rmax are referred to as engine speed in the torque-increasing operation range and are stored in storage unit 12.

If the determination result in step S118 shows that the engine speed is either equal to or higher than maximum value Rmax or equal to or lower than minimum value Rmin, target torque setting section 11f sets target transmission torque Ttg at EG torque TEac (step S108). Thereby, rotational speed maintaining control is performed. In contrast, if engine speed Rac is higher than minimum value Rmin and lower than maximum value Rmax, target torque setting section 11f determines whether or not the difference between EG torque TEac and request transmission torque Treq (Treq−TEac) is larger than the aforementioned maximum value ΔTmax (step S109), and then performs the subsequent process. Thereby, rotational speed induction control is performed.

In this embodiment, request follow-up control is replaced with rotational speed maintaining control, if engine 30 operates in an operation range in which the engine speed exceeds a predetermined value (maximum value Rmax or minimum value Rmin). This prevents engine speed from excessively increasing or decreasing 6 even when engine 30 operates in the torque-increasing operation range.

In turn, if the current operating condition of engine 30 falls within the torque-decreasing operation range, and the engine speed exceeds a predetermined maximum value Rmax2 or a predetermined minimum value Rmin2, control unit 11 may perform rotational speed maintaining control. This prevents engine speed from excessively increasing or decreasing during engaging operation of clutch 40, even if the current operating condition of engine 30 falls within the torque-decreasing operation range.

In addition, under rotational speed induction control, target torque setting section 11f controls clutch actuator 14 by setting target transmission torque Ttg in accordance with request transmission torque Treq in order for the engine speed to reach request torque rotational speed Rreq. In other words, target torque setting section 11f assigns request transmission torque Treq and EG torque TEac to expression (2) in order to calculate target transmission torque Ttg. However, under rotational speed induction control, target torque setting section 11f may set target transmission torque Ttg according to a predetermined value (hereinafter referred to as fixed transmission torque) in place of request transmission torque Treq. For example, target torque setting section 11f may assign the fixed transmission torque, instead of request transmission torque Treq, to expression (2) in order to calculate target transmission torque Ttg. This allows control unit 11 to actuate clutch actuator 14 such that an engine speed approximately at which EG torque TEac is equal to the fixed transmission torque is outputted.

In addition, under rotational speed maintaining control, control unit 11 sets target transmission torque Ttg at EG torque TEac, and actuates clutch actuator 14 according to the difference between target transmission torque Ttg and actual transmission torque Tac, thereby suppressing changes in engine speed. However, control unit 11 may perform rotational speed maintaining control based on engine speed rather than that based on the above torque difference. Such control is executed as described below, for example.

Storage unit 12 stores in advance a table that establishes the correspondence between the command actuation amount of clutch actuator 14, and the rate-of-change of engine speed Ωe (the rate-of-change of EG speed (dΩe/dt)) and the clutch rotational speed difference. For example, this table is established such that as the rate-of-change of EG speed (dΩe/dt) increases, the command actuation amount increases. This table is also established such that as the clutch rotational speed difference increases, the command actuation amount decreases. When storage unit 12 stores such a table, during engaging operation of clutch 40, control unit 11 calculates the rate-of-change of EG speed (dΩe/dt) in a predetermined cycle based on the signal inputted from engine speed detector 18, while calculating the clutch rotational speed difference based on the signals inputted from clutch rotational speed detectors 23a, 23b. Then, control unit 11 refers to the table to obtain the command actuation amount that corresponds to the calculated rate-of-change of EG speed (dΩe/dt) and clutch rotational speed difference, and outputs a control signal to clutch actuator 14 according to the obtained command actuation amount. Due to the execution of such rotational speed maintaining control, the rate-of-change of EG speed (dΩe/dt) gradually decreases during the engaging operation of clutch 40, and consequently, actual transmission torque Tac approximates EG torque TEac. Thus, the engine speed is prevented from excessively increasing or decreasing.

In turn, control unit 11 may perform rotational speed induction control based on engine speed, rather than that based on the torque difference. Such control is executed as described below, for example.

Storage unit 12 stores in advance a table that establishes the correspondence between the command actuation amount, and the clutch rotational speed difference and the rate-of-change of the difference (Rreq−Ωe) between request torque rotational speed Rreq and the current engine speed Ωe (d(Rreq−Ωe)/dt). For example, this table is established such that as the rate-of-change (d (Rreq−Ωe)/dt) increases, the command actuation amount increases. This table is also established such that as the clutch rotational speed difference increases, the command actuation amount decreases. When storage unit 12 stores such a table, control unit 11 obtains request transmission torque Treq during the engaging operation of the clutch and refers to the aforementioned EG torque table to obtain request torque rotational speed Rreq that corresponds to the obtained request transmission torque Treq. Then, control unit 11 obtains engine speed Ωe based on the signal inputted from engine speed detector 18 and calculates the rate-of-change (d(Rreq−Ωe)/dt). Control unit 11 also calculates the clutch rotational speed difference based on the signals inputted from clutch rotational speed detectors 23a, 23b. Then, referring to the aforementioned command actuation amount correspondence table, control unit 11 obtains the command actuation amount that corresponds to the rate-of-change (d (Rreq−Ωe)/dt) and the clutch rotational speed difference, and outputs a control signal to clutch actuator 14 according to the obtained command actuation amount. Due to execution of such rotational speed induction control, engine speed increases or decreases to request torque rotational speed Rreq determined according toward request transmission torque Treq, thereby preventing engine speed from excessively increasing or decreasing.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A clutch controller comprising:
an actuator for changing a degree of engagement between drive-side and driven-side members of a clutch that are downstream of an engine in a torque transmission path;
an actual torque obtaining section for obtaining torque transmitted from the drive-side member to a downstream mechanism of the torque transmission path as actual transmission torque, the downstream mechanism including the driven-side member;
a request torque obtaining section for obtaining torque determined based on a rider's accelerator operation as request transmission torque; and
a control unit for performing a first control under which the actuator is actuated based on a difference between the actual transmission torque and the request transmission torque, such that the actual transmission torque approximates the request transmission torque,
wherein the control unit performs a second control, in place of the first control, under which the actuator is actuated such that an engine speed increases or decreases to a predetermined engine speed, in an operation range in which engine torque outputted from the engine increases as the engine speed increases.

2. The clutch controller according to claim 1, wherein the actual torque obtaining section calculates the actual transmission torque based on the engine torque and inertia torque produced due to inertia of a mechanism upstream of the drive-side member in the torque transmission path.

3. The clutch controller according to claim 1, wherein the predetermined engine speed depends on the request transmission torque.

4. The clutch controller according to claim 3, wherein
the control unit includes a target torque setting section for setting torque that is supposed to be transmitted from the drive-side member to the downstream mechanism as a target transmission torque,
the target torque setting section sets the target transmission torque, such that either the target transmission torque or the request transmission torque is higher than the engine torque, while the other is lower than the engine torque, under the second control, and
the control unit actuates the actuator based on a difference between the actual transmission torque and the target transmission torque, such that the actual transmission torque approximates the target transmission torque, under the second control.

5. The clutch controller according to claim 4, wherein the target torque setting section sets the target transmission torque based on a difference between the engine torque and the request transmission torque.

6. The clutch controller according to claim 1, wherein
the control unit includes a determining section for determining whether or not the engine operates in an operation range in which the engine torque increases as the engine speed increases, and
the determining section determines whether or not the engine operates in an operation range in which the engine torque increases as the engine speed increases based on whether or not the engine torque approximates the request transmission torque when the first control is performed.

7. A straddle-type vehicle comprising the clutch controller according to claim 1.

8. A method for controlling a clutch comprising the steps of:
obtaining torque transmitted from a drive-side member of the clutch to a driven-side member of the clutch or a mechanism downstream of the driven-side member in a torque transmission path as actual transmission torque;
obtaining torque determined based on a rider's accelerator operation as request transmission torque;
performing a first control under which an actuator, which changes a degree of engagement between the drive-side member and the driven-side member, is actuated based on a difference between the actual transmission torque and the request transmission torque, such that the actual transmission torque approximates the request transmission torque, in an operation range in which engine torque outputted from an engine decreases as an engine speed increases; and
performing a second control under which the actuator is actuated such that the engine speed increases or decreases to a predetermined engine speed in an operation range in which the engine torque increases as the engine speed increases.

* * * * *